(12) United States Patent
Auner et al.

(10) Patent No.: US 11,352,377 B2
(45) Date of Patent: *Jun. 7, 2022

(54) PROCESS FOR THE PRODUCTION OF ORGANOHYDRIDOCHLOROSILANES

(71) Applicant: MOMENTIVE PERFORMANCE MATERIALS INC., Waterford, NY (US)

(72) Inventors: Norbert Auner, Glashütten (DE); Tobias Santowski, Langenselbold (DE); Alexander Sturm, Mainz (DE)

(73) Assignee: Momentive Performance Materials Inc., Waterford, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/647,719

(22) PCT Filed: Sep. 20, 2018

(86) PCT No.: PCT/US2018/051857
§ 371 (c)(1),
(2) Date: Mar. 16, 2020

(87) PCT Pub. No.: WO2019/060484
PCT Pub. Date: Mar. 28, 2019

(65) Prior Publication Data
US 2020/0223874 A1   Jul. 16, 2020

(30) Foreign Application Priority Data

Sep. 20, 2017 (EP) ..................... 17192242
Jun. 15, 2018 (EP) ..................... 18177923

(51) Int. Cl.
*C07F 7/14* (2006.01)

(52) U.S. Cl.
CPC ..................... *C07F 7/14* (2013.01)

(58) Field of Classification Search
None
See application file for complete search history.

(56) References Cited

U.S. PATENT DOCUMENTS

| | | |
|---|---|---|
| 5,856,548 A | 1/1999 | Drose et al. |
| 11,008,349 B2 * | 5/2021 | Auner ..................... C07F 7/083 |
| 2008/0020710 A1 | 1/2008 | Kim et al. |
| 2008/0200710 A1 | 8/2008 | Toma et al. |

OTHER PUBLICATIONS

International Search Report and Written Opinion from PCT/US2018/051857 dated Nov. 28, 2018.

* cited by examiner

*Primary Examiner* — Clinton A Brooks
(74) *Attorney, Agent, or Firm* — Dilworth & Barrese, LLP

(57) ABSTRACT

The invention relates to a process for the manufacture of organomonosilanes bearing both hydrogen and chlorine substituents at the silicon atom by subjecting a silane substrate comprising one or more silanes selected from organomonosilanes, organodisilanes and organocarbodisilanes, with the proviso that at least one of these silanes has at least one chlorine substituent at the silicon atom, to a redistribution reaction in the presence of a phosphane or amine acting as a redistribution catalyst.

15 Claims, No Drawings

PROCESS FOR THE PRODUCTION OF ORGANOHYDRIDOCHLOROSILANES

CROSS-REFERENCE TO RELATED APPLICATIONS

The present application is a U.S. National Phase Application of PCT Application No. PCT/US2018/051857, filed on Sep. 20, 2018, to which priority is claimed from EP Patent Application No. 17192242.0 filed Sep. 20, 2017, and EP Patent Application No. 18177923.2 filed Jun. 15, 2018 both of which are incorporated herein by reference in their entireties.

TECHNICAL FIELD

The present invention relates to the production of hydridosilanes, in particular to the production of hydridochlorosilanes, in particular, mono- and dichlorohydridosilanes, in particular, methylchlorohydridomonosilanes selected from $Me_2Si(H)Cl$, $MeSi(H)Cl_2$, and $MeSi(H)_2Cl$. More specifically, the invention relates to a process for the production of hydridochlorosilanes starting from organochlorosilanes.

BACKGROUND OF THE INVENTION

Organohydridosilanes are highly useful starting materials in synthetic organosilicon chemistry, and therefore constitute an industrially valuable class of compounds. Such organosilanes bearing both chloro- and hydrido substituents constitute attractive starting materials in synthesis due to their bifunctional nature, which means they have functional groups of different reactivities. The chloride substituent is a better leaving group than the hydride group and allows, for instance, the controlled addition of further monomeric or oligomeric siloxane units with retention of the Si—H bond under mild conditions, thereby rendering said chlorohydridosilanes useful as blocking and coupling agents in the synthesis of defined oligo- and polysiloxanes synthesis.

Such compounds generally find a wide range of applications, for instance for the manufacture of adhesives, sealants, mouldings, composites and resins for example in the fields of electronics, automotive, construction and many more.

The Si—H moieties present in hydridochlorosilanes can be utilized for post-synthesis modifications and functionalisations, for instance for the introduction of organic residues to polyorganosiloxanes or for cross-linking by hydrosilylation reactions, which is desirable in various kinds of compositions containing polyorganosiloxanes.

Synthesis of functionalized polysiloxanes starting with transformations via the Si—H bond(s) followed by hydrolysis or alcoholysis of the Si—Cl bond(s) and optionally condensation for the formation of polysiloxanes is also viable.

US 2008/0200710 A1 discloses a method for preparing dimethylchlorosilane by reacting 1,2-tetramethyldichlorodisilane with hydrogen chloride in the presence of a catalyst mixture of a) palladium, b) a tertiary amine, and c) a tertiary phosphine. The percentage of hydridosilanes obtained in such process is comparatively low and the process requires an expensive metal catalyst.

U.S. Pat. No. 5,856,548 A relates to a process for preparing dimethylmonochlorosilane $(CH_3)_2Si(H)Cl$ establishing a reaction mixture comprising dimethyldichlorosilane $(CH_3)_2SiCl_2$, magnesium hydride, and aluminum chloride, in an inert liquid organic vehicle, and partially hydrogenating said dimethyldichlorosilane in said reaction mixture while milling continually in said liquid organic vehicle. This process is a mere hydrogenation process, which has nothing in common with the process of US 2008/0200710 A1 which is a catalytic cleavage with HCl. The process of U.S. Pat. No. 5,856,548 suffers from the disadvantage of using highly corrosive aluminum chloride, which is also supposed to catalyze the undesired disproportionation of chlorohydridomethylsilanes to chloromethylsilanes and hydridomethylsilanes, decreasing the yield of the desired chlorohydridomethylsilanes, and also promotes the formation of byproducts. None of the processes described in US 2008/0200710 A1 or U.S. Pat. No. 5,856,548 describe the use of a redistribution catalyst. In US 2008/0200710 A1 the amine and phosphine merely serve to stabilize the palladium catalyst.

Although there is a high demand for such bifunctional silanes having both Si—H and Si—Cl bonds, there is no practical, economically reasonable and sustainable industrial process for the synthesis of such building blocks disclosed yet. In particular for the methylchlorohydridomonosilanes selected from $Me_2Si(H)Cl$, $MeSi(H)Cl_2$, and $MeSi(H)_2Cl$, in particular, $MeSiHCl_2$ and $Me_2SiHCl$, there is a strong need for such a production process.

Many procedures for the production of chlorosilanes containing both Si—H and Si—Cl bonds are based on organohydridosilanes serving as starting materials. The preparation of organosilicon hydrides and organosilicon compounds containing both Si—H and Si—Cl bonds from organosilicon halides, in particular, organosilicon chlorides, is also known in the art.

Problem to be Solved

The problem to be solved by the present invention is the provision of a process for the production of in particular mono- and dichlorohydridoorganosilanes from in particular chlorosilanes. In particular, it is an object of present invention to provide a new process with improved performance over the conventional methods regarding yield of the reaction, purity of products, selectivity of the conversion, convenience of the reaction procedure, convenience of the work-up procedure, easy handling of the reagents and cost efficiency of the process.

According to the present invention this problem is solved as follows.

DETAILED DESCRIPTION OF THE INVENTION

In an embodiment, the present invention relates to a process for the production of hydridochloromonosilanes starting preferably from at least one chlorine-substituted silane in particular by redistribution of the substituents attached to the silicon atoms.

The present invention is directed to a process for the manufacture of monosilanes of the general formula (I):

$$R_xSiH_yCl_z \qquad (I),$$

wherein R is an organyl group,
x=1 to 3, preferably 1 to 2,
y=1 to 3, preferably 1 to 2,
z=0 to 3, preferably 1 to 2, and
x+y+z=4,
comprising:
A) the step of subjecting a silane substrate comprising one or more silanes, selected from the group of:
a) monosilanes of the general formula (II)

$$R_aSiH_bCl_c \qquad (II)$$

wherein R is as defined above,
a=1 to 3,
b=0 to 3,
c=0 to 3 and
a+b+c=4, and b) disilanes of the general empirical formula (III)

$$R_e Si_2 H_f Cl_g \quad (III)$$

wherein R is as defined above,
 e=1 to 5,
 f=0 to 5,
 g=0 to 5 and
 e+f+g=6,
c) carbodisilanes of the general empirical formula (IV)

$$R_m(SiCH_2Si)H_nCl_o \quad (IV)$$

wherein R is as defined above,
 m=1 to 5,
 n=0 to 5,
 o=0 to 5 and
 m+n+o=6
to a reaction in the presence of one or more compounds (C) selected from the group consisting of:
 phosphanes $R^1_3P$, wherein $R^1$ is hydrogen or an organyl group and can be the same or different, preferably $R_3P$, wherein R is as defined above and can be the same or different, such as $PPh_3$, and
 amines $R^1_3N$, wherein $R^1$ is hydrogen or an organyl group and can be the same or different, preferably tertiary amines $R_3N$, wherein R is as defined above and can be the same or different, such as $n-Bu_3N$ or $NPh_3$, and
B) optionally a step of separating the resulting monosilanes of the general formula (I) from the reaction mixture
with the provisos
(i) at least one silane of the formula (II), (III) or (IV) has at least one chlorine substituent at the silicon atom,
and at least one, preferably one of the following provisos (ii) and (iii):
(ii) at least one of the silane of the formula (II), (III) or (IV) has at least one hydrido substituent at the silicon atom,
(iii) step A) is carried out in the presence of one or more hydride donors.

In the present application it will be understood that any numerical range recited herein includes all sub-ranges within that range and any combination of the various endpoints of such ranges or sub-ranges, be it described in the examples or anywhere else in the specification.

In the present application it will also be understood herein that any of the components of the invention herein as they are described by any specific genus or species detailed in the examples section of the specification, can be used in one embodiment to define an alternative respective definition of any endpoint of a range elsewhere described in the specification with regard to that component, and can thus, in one non-limiting embodiment, be used to supplant such a range endpoint, elsewhere described.

In the present application it will be further understood that any compound, material or substance which is expressly or implicitly disclosed in the specification and/or recited in a claim as belonging to a group of structurally, compositionally and/or functionally related compounds, materials or substances includes individual representatives of the group and all combinations thereof.

While the present application contains many specifics, these specifics should not be construed as limitations on the scope of the invention, but merely as exemplifications of preferred embodiments thereof. Those skilled in the art may envision many other possible variations that are within the scope and spirit of the invention as defined by the claims appended hereto.

In a preferred embodiment the process according to the invention is carried out without supply of hydrogen chloride and/or in the absence of a metal catalyst, preferably in the absence of aluminum chloride catalyst or a palladium catalyst. "Absence" means that there is no functional (or productive) amount of hydrogen chloride and/or a metal catalyst. That is, the "absence" shall include the presence of a nonfunctional or non-productive amount of a respective compound such as an impurity.

In an embodiment of the process of the present invention, preferably one compound of the general formula (I) or a mixture of more than one compound of general formula (I) is formed.

Preferably, the substituent R represents an organyl group, which is bound to the silicon atom via a carbon atom, and which organyl group can be the same or different. Preferably the organyl group is an optionally substituted, more preferably unsubstituted group, which is selected from the groups consisting of: alkyl, aryl, alkenyl, alkynyl, alkaryl, aralkyl, aralkenyl, aralkynyl, cycloalkyl, cycloalkenyl, cycloalkynyl, cycloaralkyl, cycloaralkenyl, cycloaralkynyl, even more preferably alkyl, cycloalkyl, alkenyl and aryl, even further preferred methyl, vinyl and phenyl, and most preferably R is a methyl group (herein abbreviated as Me).

$R^1$ is hydrogen or an organyl group, wherein the organyl group is as defined as in the definition of R above.

According to the present invention, an organyl group is any organic substituent group, regardless of functional type, having one free valence at a carbon atom thereof.

Preferably, the monosilanes of the general formula (I) formed in the process of the present invention include compounds selected from the group of: $RSiH_2Cl$, $R_2SiHCl$, $RSiHCl_2$, more preferably from $R_2SiHCl$ and $RSiHCl_2$, with R as defined above, preferably methyl, vinyl and phenyl, most preferred methyl.

Further preferably, the monosilanes of the general formula (I) formed in the process of the present invention are selected from the group of: $MeSiH_2Cl$, $Me_2SiHCl$, $MeSiHCl_2$, more preferably from $Me_2SiHCl$ and $MeSiHCl_2$.

The disilanes of the general formula (III)

$$R_e Si_2 H_f Cl_g \quad (II)$$

can be depicted also by the structural formula:

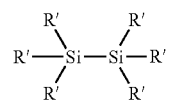

wherein the substituents R' are independently selected from organyl groups (R) as defined above, hydrogen (H) and chlorine (Cl), wherein the number of organyl groups e=1 to 5, the number of hydrogen atoms f=0 to 5 and the number of chlorine atoms g=0 to 5, and the total of e+f+g=6.

The carbodisilanes of the general formula (IV)

$$R_m(SiCH_2Si)H_nCl_o \quad (IV)$$

can be depicted also by the structural formula:

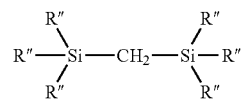

wherein the substituents R" are independently selected from organyl groups (R) as defined above, hydrogen (H) and chlorine (Cl), and wherein the number of organyl groups m=1 to 5, the number of hydrogen atoms n=0 to 5, the number of chlorine atoms o=0 to 5, and m+n+o=6.

According to the present invention, the silane substrate can be any mixture comprising one or more of the silanes of the general formula (II), (III) and (IV). Herein, the silane substrate preferably comprises greater than about 50 weight-% of silanes of the general formulae (II), (III) and (IV) and other silanes, more preferably greater than about 75 weight-% of silanes of the general formulae (II), (III) and (IV) and other silanes, and even more preferably greater than about 90 weight-% of silanes of the general formulae (II), (III) and (IV) and other silanes, based on the total weight of the silane substrate.

The "other silanes" herein comprises for example mono-, di-, oligo and polysilanes as well as carbosilanes not falling under the general formulae (II), (III) or (IV); wherein these other silanes may be substituted with organyl-, chlorine- and hydrogen substituents.

Preferably the amount of the silanes of the general formulae (II), (III) and (IV) in the silane substrate is greater than about 50 weight-%, more preferably greater than about 70 weight-%, even more preferably greater than about 90 weight-% and most preferably greater than about 95 weight-%. Preferably the silane substrate apart from the silanes of the general formulae (II), (III) and (IV) consists of other silanes not covered by formulae (II), (III) and (IV).

According to of the present invention, the term "subjecting to the reaction" refers to any way of combining the silane substrate, and the one or more compounds (C) selected from phosphanes $R^1_3P$ and/or amines $R^1_3N$, in order to perform a reaction of the silane substrate leading to the formation of products of the general formula (I), preferably in an open or closed reaction vessel, wherein the reaction may be performed in continuous or batch-wise manner. Herein, the products of the general formula (I) are formed in particular by a redistribution reaction catalyzed by one or more compounds (C) selected from phosphanes $R^1_3P$ and amines $R^1_3N$.

According to the present invention, the term "redistribution reaction" describes the redistribution of hydrogen, chlorine substituents and/or organyl groups, preferably of hydrogen and chlorine substituents, bound to silicon atoms of one or more silane compounds comprised in the silane substrate by exchange of these substituents. The exchange can be monitored in particular by $^{29}Si$ NMR, by GC and/or GC/MS.

Preferably, by the redistribution reaction of silanes bearing only chlorine substituents at the silicon atoms and silanes bearing only hydrogen substituents at the silicon atoms (under reaction conditions), silanes of the general formula (I) bearing both hydrogen and chlorine substituents at the silicon atoms are obtained.

The redistribution reaction of silanes in the context of the present invention includes in particular the comproportionation of two different methylsilanes (one having only chlorine as additional substituents, and one having only hydrogen as additional substituents) with the formation of one specific chlorohydridomethylsilane, such as e.g.

opposite to the undesired disproportionation where a chlorohydridomethylsilane react to form two different methylsilanes (one having only chlorine as additional substituents, and one having only hydrogen as additional substituents):

The latter is for example supposed to be promoted by certain metal catalysts such as $AlCl_3$ etc. Accordingly in the present invention the use of a metal catalyst such as $AlCl_3$, or transition metal catalysts such as palladium catalysts is preferably excluded. More preferably the substantial presence of any metal catalyst is excluded in the process of the present invention. Substantial presence means that the metal catalyst is present in a functional or productive amount, not e.g. as an impurity.

In an embodiment, preferably, the monosilanes comprised in the silane substrate subjected to the reaction of the process are represented by the general formula (II), wherein a is 1 or 2. More preferably, the monosilanes are represented by the general formula (II) with a=1 or 2, wherein b=0. Even more preferably, the monosilanes are represented by the general formula (II) with a=1 or 2, b=0 and R is methyl, vinyl or phenyl.

In another embodiment, the monosilanes are represented by the general formula (II) with a=1 or 2, wherein c=0. Even more preferably, the monosilanes are represented by the general formula (II) with a=1 or 2, c=0 and R is methyl, vinyl or phenyl.

Most preferably, the monosilanes represented by the general formula (II) are $MeSiCl_3$, $Me_2SiCl_2$, $MeSiH_3$ and $Me_2SiH_2$.

Preferred disilanes (having a Si—Si moiety) of the general empirical formula (III) for the production of silanes of the general formula (I) are $R_2Si_2Cl_4$, $R_3Si_2Cl_3$ and $R_4Si_2Cl_2$, or $R_2Si_2H_4$, $R_3Si_2H_3$ and $R_4Si_2H_2$, wherein R is as defined above. More preferably, R is selected from alkyl, aryl and alkenyl groups, even more preferably from the group of phenyl, vinyl and methyl groups.

In the entire application the meaning of the term "empirical formula" intends to mean that the formulae do not represent the structural formulae, but just sum up the chemical groups or atoms present in the molecule. For example the empirical formula $R_2Si_2Cl_4$ may comprise the structural formulae:

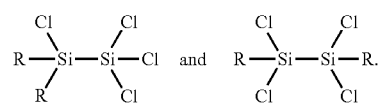

Particularly preferred disilanes of the general formula (III) for the reaction leading to silanes of the general empirical formula (I) are $Me_2Si_2Cl_4$, $Me_3Si_2Cl_3$, $Me_4Si_2Cl_2$ and $Me_2Si_2H_4$, $Me_3Si_2H_3$, $Me_4Si_2H_2$.

Preferred carbodisilanes (having a Si—$CH_2$—Si moiety) of the general formula (IV) for the reaction leading to silanes of the general formula (I) are $RCl_2Si$—$CH_2$—$SiCl_2R$, $R_2ClSi$—$CH_2$—$SiCl_2R$, $R_2ClSi$—$CH_2$—$SiClR_2$, $R_3Si$—$CH_2$—$SiCl_2R$ and $R_3Si$—$CH_2$—$SiClR_2$, wherein R is as defined above. More preferably, R is selected from alkyl, aryl and alkenyl groups, even more preferably from phenyl, vinyl and methyl groups.

Also preferred carbodisilanes of the general formula (IV) for the reaction leading to silanes of the general formula (I) are $RH_2Si$—$CH_2$—$SiH_2R$, $R_2HSi$—$CH_2$—$SiH_2R$, $R_2HSi$—$CH_2$—$SiHR_2$, $R_3Si$—$CH_2$—$SiH_2R$ and $R_3Si$—$CH_2$—$SiHR_2$, wherein R is as defined above. More preferably, R is selected from alkyl, aryl and alkenyl groups, even more preferably from phenyl, vinyl and methyl groups.

Particularly preferred carbodisilanes of the general formula (III) leading to compounds of the general formula (I) are $MeCl_2Si$—$CH_2$—$SiCl_2Me$, $Me_2ClSi$—$CH_2$—$SiCl_2Me$, Me$_2$ClSi—CH$_2$—SiClMe$_2$ and MeH$_2$Si—CH$_2$—SiH$_2$Me, Me$_2$HSi—CH$_2$—SiH$_2$Me, Me$_2$HSi—CH$_2$—SiHMe$_2$.

Also preferably, the disilanes and carbodisilanes of the general formulae (III) and (IV) are comprised by the Direct Process Residue, or can be derived from precursors present in the Direct Process Residue by partial or full hydrogenation.

According to the invention, the term "Direct Process Residue (DPR)" refers to the residues of the Rochow-Müller Direct Process.

The primary commercial method to prepare alkylhalosilanes and arylhalosilanes is through the Rochow-Müller Direct Process (also called Direct Synthesis or Direct Reaction), in which copper-activated silicon is reacted with the corresponding organohalide, in particular methyl chloride, in a gas-solid or slurry-phase reactor. Gaseous products and unreacted organohalide, along with fine particulates, are continuously removed from the reactor. Hot effluent exiting from the reactor comprises a mixture of copper, metal halides, silicon, silicides, carbon, gaseous organohalides, organohalosilanes, organohalodisilanes, carbosilanes and hydrocarbons. Typically this mixture is first subjected to gas-solid separation in cyclones and filters. Then the gaseous mixture and ultrafine solids are condensed in a settler or slurry tank from which the organohalides, organohalosilanes, hydrocarbons and a portion of organohalodisilanes and carbosilanes are evaporated and sent to fractional distillation to recover the organohalosilane monomers. The solids accumulated in the settler along with the less volatile silicon-containing compounds are purged periodically and sent to waste disposal or to secondary treatment.

Organohalodisilanes and carbosilanes left in the post-distillation residues are also fed to hydrochlorination. Organohalodisilanes, organohalopolysilanes and carbosilanes, related siloxanes and hydrocarbons, either in the post-distillation residues or in the slurry purged from the reactor, boil above organohalosilane monomers. Collectively they are referred to as Direct Process Residue (DPR). The terms higher boilers, high-boiling residue and disilane fraction are also used interchangeably with DPR.

In accordance with the present invention, hydrogenation of the DPR refers to any reaction in which chlorine substituents of silanes of the DPR are exchanged with hydrogen substituents. The resulting product is referred to as "hydrogenated DPR".

According to the present invention, the DPR may be partially or fully hydrogenated, wherein the term fully hydrogenated means that all chlorine substituents at the silicon atoms are exchanged with hydrogen substituents.

Hydrogenation is carried out with a hydride donor, selected from the group of metal hydrides, preferably complex metal hydrides such as LiAlH$_4$, n-Bu$_3$SnH, NaBH$_4$, (i-Bu$_2$AlH)$_2$ or sodium bis(2-methoxyethoxy)aluminumhydride, which is commercially available under the trademarks Vitride® or Red-Al®, for instance, or binary metal hydrides, in particular sodium hydride, lithium hydride or combinations thereof, most preferably lithium hydride.

According to the present invention, a hydride donor is any compound being capable of providing hydride anions for the Si—Cl/Si—H exchange in silanes of the formulae (II), (III) and (IV).

Preferably, the substrates according to the general formulae (II), (III) and (IV) comprises one or more, preferably one or two specific compounds represented by one of the general formulae (II), (III) and (IV) in a total amount of greater than 75 wt.-% based on the total weight of the silane substrate. More preferably, mixtures of compounds represented by the general formulae (II), (III) and (IV) are submitted to the reaction conditions in step A).

Preferably, the products of the general formula (I) are formed by subjecting one or more silanes of the general formulae (II), (III) or (IV) bearing no hydrogen substituents to the reaction with one or more silanes of the general formulae (II), (III) or (IV) bearing no chlorine substituents.

Preferably, for the production of Me$_2$SiHCl in the redistribution reaction in step A) monosilanes of the general formula (II) are selected from the group consisting of Me$_2$SiCl$_2$ and Me$_2$SiH$_2$.

Preferably, for the production of Me$_2$SiHCl in the redistribution reaction in step A) disilanes of the general formula (III) are selected from the group consisting of MeCl$_2$Si—SiClMe$_2$, Me$_2$ClSi—SiClMe$_2$, Me$_3$Si—SiClMe$_2$, MeH$_2$Si—SiHMe$_2$, Me$_2$HSi—SiHMe$_2$, Me$_3$Si—SiHMe$_2$, more preferably MeCl$_2$Si—SiClMe$_2$, Me$_2$ClSi—SiClMe$_2$, MeH$_2$Si—SiHMe$_2$, Me$_2$HSi—SiHMe$_2$, most preferably Me$_2$ClSi—SiClMe$_2$ and Me$_2$HSi—SiHMe$_2$.

Preferably, for the production of Me$_2$SiHCl in the redistribution reaction in step A) carbodisilanes of the general formula (IV) are selected from the group consisting of Me$_2$ClSi—CH$_2$—SiCl$_2$Me, Me$_2$ClSi—CH$_2$—SiClMe$_2$, Me$_2$HSi—CH$_2$—SiH$_2$Me, Me$_2$HSi—CH$_2$—SiHMe$_2$, more preferably Me$_2$ClSi—CH$_2$—SiClMe$_2$ and Me$_2$HSi—CH$_2$—SiHMe$_2$.

Preferably, for the production of MeSiHCl$_2$ in the redistribution reaction in step A) monosilanes of the general formula (II) are selected from the group consisting of MeSiCl$_3$, MeSiH$_3$ and MeSiH$_2$Cl, more preferably MeSiCl$_3$ and MeSiH$_3$.

Preferably, for the production of MeSiHCl$_2$ in the redistribution reaction in step A) disilanes of the general formula (III) are selected from the group consisting of MeCl$_2$Si—SiCl$_2$Me, MeCl$_2$Si—SiClMe$_2$, MeH$_2$Si—SiH$_2$Me, MeH$_2$Si—SiHMe$_2$, more preferably MeCl$_2$Si—SiCl$_2$Me and MeH$_2$Si—SiH$_2$Me.

Preferably, for the production of MeSiHCl$_2$ in the redistribution reaction in step A) carbodisilanes of the general formula (IV) are selected from the group consisting of MeCl$_2$Si—CH$_2$—SiCl$_2$Me, MeCl$_2$Si—CH$_2$—SiClMe$_2$, MeH$_2$Si—CH$_2$—SiH$_2$Me, MeH$_2$Si—CH$_2$—SiHMe$_2$, more preferably MeCl$_2$Si—CH$_2$—SiCl$_2$Me and MeH$_2$Si—CH$_2$—SiH$_2$Me.

In preferred compounds (C) selected from triorganophosphanes PR$_3$, R is an organyl group and can be the same or different, more preferably R is an alkyl, cycloalkyl or aryl group, most preferably the organophosphine is PPh$_3$ or n-Bu$_3$P.

In preferred compounds (C) selected from triorganoamines NR$_3$, R is an organyl group and can be the same or different, more preferably R is an alkyl, cycloalkyl or aryl group, most preferably the organoamine is NPh$_3$ or n-Bu$_3$N.

The optional step of separating the resulting chlorohydridomonosilanes of the general formula (I) refers to any technical means applied to raise the content of one or more methylmonosilanes according to the general formula (I) in a product mixture, or which results in the separation of single compounds of the formula (I) from a product mixture obtained in step A) of the process according to the invention.

Further preferably, the reaction step A) is carried out in a suitably sized reactor made of materials which are resistant to corrosion by chlorides, such as glass or Hastelloy C. A means of vigorous agitation is provided to disperse or dissolve the compound (C) and the metal hydride in the reaction mixture.

In a preferred embodiment of the invention, step A) is carried out in an organic solvent or mixtures thereof, preferably an high-boiling ether compound, more preferably 1,4-dioxane, diglyme or tetraglyme, most preferably diglyme.

According to the present invention, the term "organic solvent" refers to any organic compound or mixtures thereof which is in liquid state at room temperature, and which is suitable as a medium for conducting the redistribution reactions of step A) therein.

Accordingly, the organic solvent is preferably inert to the compounds (C) according to present invention under reaction conditions. Furthermore, the starting materials of the general formulae (II), (III) and (IV) and the products of the general formula (I) are preferably soluble in the organic solvent or fully miscible with the organic solvent, respectively.

Preferably, the organic solvent is selected from optionally substituted, preferably unsubstituted linear or cyclic aliphatic hydrocarbons, aromatic hydrocarbons or ether compounds, without being limited thereto.

Herein, the term "ether compound" shall mean any organic compound containing an ether group —O—, in particular of the formula $R^3$—O—$R^2$, wherein $R^3$ and $R^2$ are independently selected from an organyl group R as defined above.

In particular, the organyl group R is selected from optionally substituted, preferably unsubstituted, alkyl, aryl, alkenyl, alkynyl, alkaryl, aralkyl, aralkenyl, aralkynyl, cycloalkyl, cycloalkenyl, cycloalkynyl, cycloaralkyl, cycloaralkenyl, cycloaralkynyl, preferably alkyl, alkenyl and aryl groups.

Preferably, $R^3$ and $R^2$ are substituted or unsubstituted linear or branched alkyl groups or aryl groups, which may have further heteroatoms such as oxygen, nitrogen, or sulfur. In the case of cyclic ether compounds, $R^3$ and $R^2$ can constitute together an optionally substituted alkylene or arylene group, which may have further heteroatoms such as oxygen, nitrogen, or sulfur, as for instance in dioxanes, in particular 1,4-dioxane.

The ether compounds can be symmetrical or asymmetrical with respect to the substituents at the ether group —O—.

The term "ether compound" according to the invention also comprises linear ether compounds in which more than one ether group may be included, forming a di-, tri-, oligo- or polyether compound, wherein $R^3$ and $R^2$ constitute organyl groups when they are terminal groups of the compounds, and alkylene or arylene groups when they are internal groups.

Herein, a terminal group is defined as any group being linked to one oxygen atom which is part of an ether group, while an internal group is defined as any group linked to two oxygen atoms being a constituent of ether groups.

Preferred examples of such compounds are dimethoxy ethane, glycol diethers (glymes), in particular diglyme or tetraglyme, without being limited thereto.

According to the present invention, the term "high-boiling ether compound" is defined as an ether compound according to the above definition with a boiling point at about 1.01325 bar (standard atmosphere pressure) of preferably at least about 70° C., more preferably at least about 85° C., even more preferably at least about 100° C., and most preferably at least about 120° C.

The application of high-boiling ethers in the present invention is favorable as it facilitates separation of the desired products of the general formula (I) from the reaction mixture containing the solvent and residual starting materials. The products of the general formula (I) in general have lower boiling points than the high-boiling ethers of above definition.

For example, the boiling points of selected representative products of the general formula (I) are 35° C. ($Me_2SiHCl$) and 41° C. ($MeSiHCl_2$) at atmospheric pressure, while the representative higher-boiling ether compound diglyme has a boiling point of 162° C. at standard atmosphere pressure. Application of higher-boiling ether compounds as solvents allows higher reaction temperatures and allows a more efficient separation of the desired products from the reaction mixture by distillation.

In another preferred embodiment of the process according to the invention, step A) is carried out in the presence of one or more hydride donors, preferably one or more metal hydrides, more preferably one or more metal hydrides selected from the group of alkali metal hydrides and alkaline earth metal hydrides, and most preferably lithium hydride.

According to the present invention, the term "hydride donor" refers to any compound which is capable of donating at least one hydride anion in a reaction of any of the silane substrates of the general formulae (II), (III) and (IV) leading to a product of the general formula (I).

According to the present invention, the term "metal hydride" refers to any hydride donor containing at least one metal atom or metal ion, comprising complex metal hydrides, organometallic reagents and binary metal hydrides.

The term "complex metal hydrides" according to the invention refers to metal salts wherein the anions contain hydride anions, for example $LiAlH_4$ or $NaBH_4$. Typically, complex metal hydrides contain more than one type of metal or metalloid. In accordance with the present invention the term "metalloid" comprises the elements boron, silicon, germanium, arsenic, antimony, tellurium, carbon, aluminum, selenium, polonium, and astatine.

The term "organometallic hydride reagent" refers to compounds that contain bonds between carbon and metal atoms, and which are capable of donating at least one hydride anion used in a reaction of substrates of the general formulae (II), (III) or (IV) leading to the products of the general formula (I).

Binary metal hydrides according to of the present invention are metal hydrides consisting of ions of one specific metal and hydride ions exclusively.

Preferably, the metal hydrides according to the invention are selected from binary metal hydrides, more preferably selected from alkali metal hydrides and earth alkaline metal hydrides, even more preferably selected from the group of lithium hydride, sodium hydride, potassium hydride, magnesium hydride, calcium hydride, even more preferably from lithium hydride and sodium hydride, most preferably the metal hydride is lithium hydride.

In another preferred embodiment according to the invention, in general formula (I) and one or more of the general formulae (II), (III) or (IV) R is an alkyl or cycloalkyl group, preferably a methyl group.

Preferably, in general formula (I) and one or more of the silanes of the general formulae (II), (III) or (IV) R is an alkyl or cycloalkyl group, more preferably an alkyl or cycloalkyl group having 1 to about 20 carbon atoms, even more preferably an alkyl or cycloalkyl group having 1 to about 10 carbon atoms, even further preferably 1 to about 6 carbon atoms, and most preferably R is a methyl group.

In a preferred embodiment of the process according to the invention, all silanes of the formulae (II), (III) or (IV) in step A) have at least one chlorine substituent at one, more, or all silicon atoms.

Preferably, all silanes of the formulae (II), (III) or (IV) in step A) have at least one chlorine substituent at one, more, or all silicon atom(s), more preferably all silanes of the formulae (II), (III) or (IV) in step A) have more chlorine substituents than hydrogen substituents at one, or more or all silicon atoms.

In a further preferred embodiment of the process according to the invention, all silanes of the formulae (II) (III) or (IV) in step A) have no hydrogen substituent at one, more or all silicon atoms.

Preferably, all silanes of the general formulae (II), (III) or (IV) in step A) have no hydrogen substituent at one, more or all silicon atoms, more preferably all silanes of the general formulae (II), (III) or (IV) in step A) have no hydrogen substituent and 1 or 2 substituents R at one, more or all silicon atoms, wherein R is an organyl group preferably as defined above.

In another preferred embodiment of the process according to the invention, the silane substrate comprises greater than about 90 wt-% of one or two specific silanes of the formulae (II), (III) or (IV), based on the total weight of the silane substrate, having at least one chlorine substituent at one, more or all silicon atoms. In this embodiment preferably a metal hydride is added in step A).

Preferably, the silane substrate comprises greater than about 90 wt-% of one or two specific silanes of the formulae (II), (III) or (IV) having at least one chlorine substituent at one, more or all silicon atoms, more preferably the silane substrate comprises greater than about 90 wt-% of one or two specific silanes of the formulae (II), (III) or (IV) having more chlorine substituents than hydrogen substituents at one, more or all silicon atoms, wherein each percentage is based on the total weight of the silane substrate. In this embodiment preferably a metal hydride is added in step A).

In another further preferred embodiment of the process according to the invention, the silane substrate comprises greater than about 90 wt-% of one or two specific silanes of the general formulae (II), (III) or (IV) having no hydrogen substituent at one, more or all silicon atoms, based on the total weight of the silane substrate. In this embodiment preferably a metal hydride is added in step A).

Preferably, the substrate comprises greater than about 90 wt-% of one or two specific silanes of the formulae (II), (III) or (IV) having no hydrogen substituent at one, more or all silicon atoms, more preferably the specific silanes of the formulae (II), (III) or (IV) have no hydrogen substituent and 1 or 2 substituents R at one, more or all silicon atoms, wherein R is an organyl group preferably as defined above, wherein the weight percentage is based on the total weight of the silane substrate. In this embodiment preferably a metal hydride is added in step A).

In a preferred embodiment of the process according to the invention, the silane substrate of the general formulae (II), (III) or (IV) having one or more hydrogen substituents at one, more or all silicon atoms in step A) are prepared by a hydrogenation reaction prior to step A).

Herein, all silane substrates of the general formulae (II), (III) or (IV) having one or more hydrogen substituents at one, more or all silicon atoms in step A) may be prepared by a hydrogenation step prior to step A), or only a part of the silane substrates of the general formulae (II), (III) or (IV) having one or more hydrogen substituent at one, more or all silicon atoms in step A) may be prepared by a hydrogenation reaction prior to step A).

According to the invention, the term "hydrogenation" refers to the exchange of one or more chlorine substituents at silicon atoms by the same number of hydrogen substituents.

Preferably, the hydrogenation reactions prior to step A) leading to hydrogenated substrates of the general formulae (II), (III) and (IV) are performed with a hydride donor selected from the group of metal hydrides, preferably complex metal hydrides and organometallic hydride reagents such as $LiAlH_4$, $n\text{-}Bu_3SnH$, $NaBH_4$, $i\text{-}Bu_2AlH$ or sodium bis(2-methoxyethoxy) aluminum hydride.

In a likewise preferred embodiment of the process according to the invention, the amount of the metal hydride in step A) in relation to the silane substrate compounds is in the range of about 0.05 mol-% to about 395.95 mol-%, preferably about 20 mol-% to about 200 mol-%, more preferably about 50 mol-% to about 150 mol-%, and most preferably about 80 mol-% to about 100 mol-%. Herein, the molar ratio in % is defined as

[$n$ (metal hydride added to the reaction mixture in step $A$))/$n$ (silane substrate compounds of the general formulae (II), (III) and/or (IV))]×100.

For the determination of this molar ratio, the compounds selected from monosilanes of the general formula (II), disilanes of the general formula (III) and carbodisilanes of the general formula (IV) are considered, regardless if they are submitted as a part of a mixture comprising other compounds, in particular disilanes and carbodisilanes which do not fall under the general formulae (II), (III) or (IV) respectively.

In a further preferred embodiment of the process according to the invention, the amount of the one or more compounds (C) in step A) in relation to the silane substrate compounds in step A) is in the range of about 0.0001 mol-% to about 600 mol-%, more preferably about 0.01 mol-% to about 20 mol-%, even more preferably about 0.05 mol-% to about 2 mol-%, and most preferably about 0.05 mol-% to about 1 mol-%. Herein, the molar ratio in % is defined as

[$n$ (compound or compounds (C) in step $A$))/$n$ (silane substrate compounds of the general formulae (II), (III) and (IV) in step $A$))]×100.

For the determination of this molar ratio, all compounds falling under the definition of the compound (C), are considered, and all compounds being monosilanes of the general formula (II), disilanes of the general formula (III) and carbodisilanes of the general formula (IV) submitted to the reaction step A) are considered, regardless if they are submitted as a part of a mixture comprising other compounds, in particular disilanes and carbodisilanes which do not fall under the general formulae (II), (III) or (IV).

In another preferred embodiment of the process according to the invention, in the step A) the weight ratio of the silane substrates to the organic solvent(s) is in the range of about 0.01 to about 100, preferably in the range of about 0.1 to about 10, more preferably about 0.5 to about 4, most preferably about 0.5 to about 1. Herein, the weight ratio is defined as $m$ (silane substrate compounds of the general formulae (II), (III) and (IV) in step $A$))/$m$ (organic solvents in step $A$)).

For the determination of this ratio, all compounds being monosilanes of the general formula (II), disilanes of the general formula (III) and carbodisilanes of the general formula (IV) submitted to the reaction step A) are considered, regardless if they are submitted as a part of a mixture comprising other compounds, in particular disilanes and carbodisilanes which do not fall under the general formulae (II), (III) or (IV).

In a preferred embodiment of the process according to the invention, the step A) is conducted at a temperature of about 0° C. to about 300° C., preferably about 20° C. to about 200° C., more preferably about 80° C. to about 200° C.

According to the invention, the reaction temperature in step A) is the temperature of the reaction mixture, i.e. the temperature measured inside the reaction vessel in which the reaction is conducted.

In an also preferred embodiment of the process according to the invention, the step A) is conducted at a pressure of about 0.1 bar to about 30 bar, preferably about 1 bar to about 20 bar, most preferably about 1 bar to about 10 bar.

The indicated pressure ranges refer to the pressure measured inside the reaction vessel used when conducting reaction step A).

In another preferred embodiment of the process according to the invention, the methyl monosilanes of the formula (I) are selected from the group consisting of $Me_2SiHCl$, $MeSiHCl_2$ and $MeSiH_2Cl$.

In a further preferred embodiment of the process according to the invention, the methylmonosilanes of the formula (I) are selected from the group consisting of $Me_2SiHCl$ and $MeSiHCl_2$.

Preferably, the methylmonosilane of the formula (I) is $Me_2SiHCl$ and it is produced by submitting $Me_2SiCl_2$ to the reaction step A), more preferably the methylmonosilane of the formula (I) is $Me_2SiHCl$ and it is produced by submitting $Me_2SiCl_2$ and one or more silanes of the general formulae (II), (III) or (IV) having no chlorine substituents to the reaction step A), even more preferably the methylmonosilane of the formula (I) is $Me_2SiHCl$ and it is produced by submitting $Me_2SiCl_2$ and one or more silanes selected from the group consisting of the empirical formulae: $Me_2SiH_2$, $MeSiH_3$, $Me_2Si_2H_4$, $Me_3Si_2H_3$, $Me_4Si_2H_2$, $Me_2(SiCH_2Si)H_4$ (such as $HMe_2(SiCH_2Si)H_3$ or $H_2Me(SiCH_2Si)MeH_2$), $Me_3(SiCH_2Si)H_3$ and $Me_4(SiCH_2Si)H_2$ to the reaction step A), most preferably the methylmonosilane of the formula (I) is $Me_2SiHCl$ and it is produced by submitting $Me_2SiCl_2$ and $Me_2SiH_2$ in the reaction step A).

Further preferably, the methylmonosilane of the formula (I) is $Me_2SiHCl$ and it is produced by submitting $Me_2SiH_2$ and one or more silanes of the general formulae (II), (III) or (IV) having no hydrogen substituents to the reaction step A), even more preferably the methylmonosilane of the formula (I) is $Me_2SiHCl$ and it is produced by submitting $Me_2SiH_2$ and one or more silanes selected from the group of the empirical formulae consisting of: $Me_2SiCl_2$, $MeSiCl_3$, $Me_2Si_2Cl_4$, $Me_3Si_2Cl_3$, $Me_4Si_2Cl_2$, $Me_2(SiCH_2Si)Cl_4$, $Me_3(SiCH_2SOCl_3$ and $Me_4(SiCH_2Si)Cl_2$ to the reaction step A), most preferably the methylmonosilane of the formula (I) is $Me_2SiHCl$ and it is produced by submitting $Me_2SiH_2$ and $Me_2SiCl_2$ to the reaction step A).

Also preferably, the methylmonosilane of the formula (I) is $MeSiHCl_2$, and it is produced by submitting $MeSiCl_3$ and one or more silanes of the general formulae (II), (III) or (IV) having no chlorine substituents to the reaction step A), even more preferably the methylmonosilane of the formula (I) is $MeSiHCl_2$ and it is produced by submitting $MeSiCl_3$ and one or more silanes selected from the group consisting of silanes of the empirical formulae $Me_2SiH_2$, $MeSiH_3$, $Me_2Si_2H_4$, $Me_3Si_2H_3$, $Me_4Si_2H_2$, $Me_2(SiCH_2Si)H_4$, $Me_3(SiCH_2Si)H_3$ and $Me_4(SiCH_2Si)H_2$ to the reaction step A), most preferably the methylmonosilane of the formula (I) is $MeSiHCl_2$ and it is produced by submitting $MeSiCl_3$ and $MeSiH_3$ to the reaction step A).

Further preferably, the methylmonosilane of the formula (I) is $MeSiHCl_2$ and it is produced by submitting $MeSiH_3$ and one or more silanes of the general formulae (II), (III) or (IV) having no hydrogen substituents to the reaction step A), even more preferably the methylmonosilane of the formula (I) is $MeSiHCl_2$ and it is produced by submitting $MeSiH_3$ and one or more silanes selected from the group consisting of silanes of the empirical formulae: $Me_2SiCl_2$, $MeSiCl_3$, $Me_2Si_2Cl_4$, $Me_3Si_2Cl_3$, $Me_4Si_2Cl_2$, $Me_2(SiCH_2Si)Cl_4$, $Me_3(SiCH_2SOCl_3$ and $Me_4(SiCH_2SOCl_2$ to the reaction step A), most preferably the methylmonosilane of the formula (I) is $MeSiHCl_2$ and it is produced by submitting $MeSiH_3$ and $MeSiCl_3$ to the reaction step A).

In a further preferred embodiment of the process according to the invention, the silanes of the general formulae (II) or (III) are selected from the group consisting of silanes of the empirical formulae $Me_2SiCl_2$, $MeSiCl_3$, $Me_2Si_2Cl_4$ and $Me_4Si_2Cl_2$.

Preferably, $Me_2SiCl_2$ is selected as a starting material for the production of $Me_2SiHCl$ in step A), more preferably $Me_2SiCl_2$ is selected as a starting material for the production of $Me_2SiHCl$ in step A) in the presence of one or more silanes selected from the group consisting of silanes of the empirical formulae: $MeSiH_3$, $Me_2SiH_2$, $Me_4Si_2H_2$ and $Me_4(SiCH_2Si)H_2$, most preferably $Me_2SiCl_2$ is selected as a starting material for the production of $Me_2SiHCl$ in step A) in the presence of $Me_2SiH_2$.

Also preferably, $MeSiCl_3$ is selected as a starting material for the production of $MeSiHCl_2$ in step A), more preferably $MeSiCl_3$ is selected as a starting material for the production of $MeSiHCl_2$ in step A) in the presence of one or more silanes selected from the group consisting of silanes of the empirical formulae $MeSiH_3$, $Me_2SiH_2$, $Me_2Si_2H_4$ and $Me_2(SiCH_2Si)H_4$, most preferably $MeSiCl_3$ is selected as a starting material for the production of $MeSiHCl_2$ in step A) in the presence of $MeSiH_3$.

Further preferably, a silane of the empirical formulae $Me_2Si_2Cl_4$ is selected as a starting material for the production of $MeSiHCl_2$ in step A), more preferably $Me_2Si_2Cl_4$ is selected as a starting material for the production of $MeSiHCl_2$ in step A) in the presence of one or more silanes selected from the group of consisting of silanes of the empirical formulae $Me_2SiH_2$, $MeSiH_3$, $Me_2Si_2H_4$ or $Me_2(SiCH_2Si)H_4$, most preferably $Me_2Si_2Cl_4$ is selected as a starting material for the production of $MeSiH_3$.

Also preferably, a silane of the empirical formulae $Me_4Si_2Cl_2$ is selected as a starting material for the production of $Me_2SiHCl$ in step A), more preferably $Me_4Si_2Cl_2$ is selected as a starting material for the production of $Me_2SiHCl$ in step A) in the presence of one or more silanes selected from the group consisting of silanes of the empirical formulae of $Me_2SiH_2$, $MeSiH_3$, $Me_4Si_2H_2$ or $Me_4(SiCH_2Si)H_2$, most preferably $Me_4Si_2Cl_2$ is selected as a starting material for the production of $Me_2SiHCl$ in step A) in the presence of $Me_2SiH_2$.

In the reaction of disilanes of the general formula (III) according to the invention, the disilanes can act as a hydride donor or hydride acceptor in redistribution reactions with monosilanes of the general formula (II), and they can be cleaved to monosilanes of the general formulae (II) and (I) under the reaction conditions of step A).

In a preferred embodiment of the process according to the invention, the silanes of the general formula (II) are selected from the group consisting of $Me_2SiCl_2$ and $MeSiCl_3$.

Preferably, $Me_2SiCl_2$ is applied in step A) for the production of $Me_2SiHCl$, more preferably $Me_2SiCl_2$ is applied in step A) for the production of $Me_2SiHCl$ in the presence of one or more silanes of the empirical formulae selected from the group consisting of $MeSiH_3$, $Me_2SiH_2$, $Me_4Si_2H_2$ or $Me_4(SiCH_2Si)H_2$, most preferably $Me_2SiCl_2$ is applied in step A) for the production of $Me_2SiHCl$ in the presence of $Me_2SiH_2$.

Also preferably, $MeSiCl_3$ is applied in step A) for the production of $MeSiHCl_2$, more preferably $MeSiCl_3$ is applied in step A) for the production of $MeSiHCl_2$ in the presence of one or more silanes of the empirical formulae selected from the group consisting of $MeSiH_3$, $Me_2SiH_2$, $Me_2Si_2H_4$ or $Me_2(SiCH_2Si)H_4$, most preferably $Me_2SiCl_2$ is applied in step A) for the production of $Me_2SiHCl$ in the presence of $MeSiH_3$.

In a further preferred embodiment of the process according to the invention, step A) is carried out in the additional presence of at least one compound of the formula $R^1_4PCl$, wherein $R^1$ is as defined above.

Preferably, in the formula $R^1_4PCl$ $R^1$ is a hydrogen or an organyl group, as defined above, which can be the same or different, more preferably $R^1$ is an aromatic group or an aliphatic hydrocarbon group, even more preferably $R^1$ is an alkyl or cycloalkyl group, even further preferably $R^1$ is a n-alkyl group, and most preferably the compound of the general formula $R^1_4PCl$ is n-$Bu_4PCl$.

In the present invention, a compound of the formula $R^1_4PCl$ may act as an additional catalyst for the redistribution reaction in step A) and as a reagent for the cleavage of silanes of the general formulae (III) or (IV).

In another preferred embodiment of the process according to the invention, the one or more compounds of formula $R^1_4PCl$ are formed in situ from compounds of the formulae $R^1_3P$ and $R^1Cl$, wherein $R^1$ is H or an organyl group.

According to the invention, $R^1$ in $R^1_4PCl$ formed in situ is H or an organyl group, as defined above, and can be the same or different, and preferably $R^1Cl$ is HCl or a chloroalkane, more preferably $R^1$ is the same as in $R^1_3P$, and $R^1Cl$ is a 1-chloroalkane with up to about 20 carbon atoms, even more preferably $R^1$ is the same as in $R^1_3P$, and $R^1Cl$ is a 1-chloroalkane with up to about 10 carbon atoms, and most preferably $R^1$ is the same as in $R^1_3P$, and $R^1Cl$ is 1-chlorobutane.

The term "formed in situ" according to the invention means that the compound $R^1_4PCl$ is formed from $R^1_3P$ and $R^1Cl$ by combination of these compounds in the reaction vessel in which reaction step A) is performed, or by combination of these compounds in a separate reaction vessel prior to step A) and addition of this mixture to reaction step A) without further work-up.

In another preferred embodiment of the process according to the invention, step A) is carried out in the presence of lithium hydride.

Preferably, step A) is carried out in the presence of lithium hydride, wherein the silane substrates of the general formulae (II), (III) or (IV) do not have any hydrogen substituents at one, more or all silicon atoms, more preferably step A) is carried out in the presence of lithium hydride, wherein the silane substrates are selected from the group of silanes of the empirical formulae: $Me_2SiCl_2$, $MeSiCl_3$, $Me_2Si_2Cl_4$, $Me_3Si_2Cl_3$, $Me_4Si_2Cl_2$, $Me_2(SiCH_2Si)Cl_4$, $Me_3(SiCH_2Si)Cl_3$ and $Me_4(SiCH_2Si)Cl_2$, most preferably step A) is carried out in the presence of lithium hydride, wherein the silane substrates submitted to the reaction are selected from $Me_2SiCl_2$ and $MeSiCl_3$.

In a further preferred embodiment of the process according to the invention, in step A) $Me_2SiHCl$ is produced by the reaction of $Me_2SiCl_2$ with $Me_2SiH_2$.

Preferably, therein the molar ratio of $Me_2SiCl_2$ to $Me_2SiH_2$ is in the range of about 99 to about 1, more preferably about 5 to about 1, even more preferably about 3 to about 1, and most preferably the ratio is in the range of about 2 to about 1 and the reaction temperature is in the range of about 80° C. to about 200° C.

In a preferred embodiment of the process according to the invention, in step A) $Me_2SiHCl$ is produced by the reaction of $Me_2SiCl_2$ with $Me_2SiH_2$ in a high-boiling ether compound.

Preferably, therein the molar ratio of $Me_2SiCl_2$ to $Me_2SiH_2$ is in the range of about 99 to about 1, more preferably about 5 to about 1, even more preferably about 3 to about 1, even further preferably the molar ratio is about 2 to about 1 and the reaction temperature is in the range of about 80° C. to about 200° C., and most preferably the molar ratio is in the range of about 2 to about 1, the reaction temperature is in the range of about 120° C. to about 200° C., and the high-boiling ether compound is selected from diglyme, tetraglyme or 1,4-dioxane.

In a preferred embodiment of the process according to the invention, in step A) $MeSiHCl_2$ is produced by the reaction of $MeSiCl_3$ with $MeSiH_3$.

Preferably, therein the molar ratio of $MeSiCl_3$ to $MeSiH_3$ is in the range of about 99 to about 1, more preferably about 10 to about 1, even more preferably about 5 to about 1, and most preferably the ratio is in the range of about 3 to about 1 and the reaction temperature is in the range of about 80° C. to about 200° C.

In a preferred embodiment of the process according to the invention, $MeSiHCl_2$ is produced by the reaction of $MeSiCl_3$ with $MeSiH_3$ in a high-boiling ether compound.

Preferably, therein the molar ratio of $MeSiCl_3$ to $MeSiH_3$ is in the range of about 99 to about 1, more preferably from about 10 to about 1, even more preferably from about 5 to about 1, even further preferably the molar ratio is from about 3 to about 1 and the reaction temperature is in the range of about 80° C. to about 200° C., and most preferably the molar ratio is in the range of about 3 to about 1, the reaction temperature is in the range of about 120° C. to about 200° C., and the high-boiling ether compound is selected from diglyme, tetraglyme or 1,4-dioxane.

In a preferred embodiment of the process according to the invention, in step A) $Me_2SiHCl$ is produced by the reaction of $Me_2SiCl_2$ in the presence of lithium hydride in a high-boiling ether compound.

Preferably, for the production of $Me_2SiHCl$ in step A) a silane substrate comprising at least 90 weight-% $Me_2SiCl_2$ based on the total amount of the silane substrate or a mixture of $Me_2SiCl_2$ with other silanes with lithium hydride in a high-boiling ether compound, preferably diglyme, is submitted to step A).

In a further preferred embodiment of the process according to the invention, in step A) $Me_2SiHCl$ is produced by the reaction of $Me_2SiCl_2$ in the presence of lithium hydride in diglyme as solvent.

In another preferred embodiment of the process according to the invention, in step A) $MeSiHCl_2$ is produced by the reaction of $MeSiCl_3$ in the presence of lithium hydride in a high-boiling ether compound.

Preferably, for the production of MeSiHCl$_2$ a silane substrate comprising at least 90 weight-% MeSiCl$_3$ based on the total amount of the silane substrate or a mixture of MeSiCl$_3$ with other silanes, is submitted to step A) in the presence of lithium hydride in a high-boiling ether compound, preferably diglyme.

The process of the present invention can be performed in a continuous or batch-wise manner, preferably it is carried out in a continuous manner. Therein step A) and/or B) can be performed in a continuous or batch-wise manner, preferably both steps A) and B) are performed in a continuous manner.

In a preferred embodiment of the process according to the invention, the step B) of separating the resulting monosilanes of the formula (I) is carried out by distillation and/or condensation.

The term "distillation" according to the present invention relates to any process for separating components or substances from a liquid mixture by selective evaporation and condensation.

Therein, distillation may result in practically complete separation of the constituents of a mixture, thus leading to the isolation of nearly pure compounds, or it may be a partial separation that increases the concentration of selected constituents of the mixture in the distillate when compared to the mixture submitted to distillation.

Preferably, the distillation processes which may constitute separation step B) can be simple distillation, fractional distillation, vacuum distillation, short path distillation or any other kind of distillation known to the skilled person.

Also preferably, the step B) of separating the monosilanes of the formula (I) according to the invention can comprise one or more batch distillation steps, or can comprise a continuous distillation process.

Further preferably, the term "condensation" may comprise separation or enrichment of one or more compounds of the general formula (I) from the reaction mixture by volatilization from the reaction vessel and condensation as a liquid and/or solid in a refrigerated vessel from which it can be subsequently recovered by distillation, or by solution in an ether solvent.

As an alternative preferred way of condensation, the monosilanes can be absorbed in an ether solvent contained in a refrigerated vessel.

In accordance with the present invention, the term refrigerated applies to any object cooled to a temperature below ambient temperature, preferably below about 10° C., more preferably below about 0° C., and most preferably below about −10° C.

In a preferred embodiment of the process according to the invention, the process can be performed under inert conditions.

In accordance with the present invention, the term "performed under inert conditions" means that the process is partially or completely carried out under the exclusion of surrounding air, in particular of moisture and oxygen. In order to exclude ambient air from the reaction mixture and the reaction products, closed reaction vessels, reduced pressure and/or inert gases, in particular nitrogen or argon, or combinations of such means may be used.

PREFERRED EMBODIMENTS OF THE INVENTION

In the following, the preferred embodiments of the invention are shown.

1. Process for the manufacture of monosilanes of the general formula (I):

wherein R is an organyl group,
x=1 to 3, preferably 1 to 2,
y=1 to 3, preferably 1 to 2,
z=0 to 3, preferably 1 to 2, and
x+y+z=4,
comprising:
A) the step of subjecting a silane substrate comprising one or more silanes, selected from the group of:
a) monosilanes of the general formula (II)

wherein R is as defined above,
a=1 to 3,
b=0 to 3,
c=0 to 3 and
a+b+c=4, and
b) disilanes of the general formula (III)

wherein R is as defined above,
e=1 to 5,
f=0 to 5,
g=0 to 5 and
e+f+g=6,
c) carbodisilanes of the general formula (IV)

wherein R is as defined above,
m=1 to 5,
n=0 to 5,
o=0 to 5 and
m+n+o=6
to a reaction
in the presence of one or more compounds (C) selected from the group consisting of:
phosphanes R$^1$$_3$P, wherein R$^1$ is hydrogen or an organyl group and can be the same or different, preferably R$_3$P, wherein R is as defined above and can be the same or different, such as PPh$_3$, and
amines R$^1$$_3$N, wherein R$^1$ is hydrogen or an organyl group and can be the same or different, preferably R$_3$N, wherein R is as defined above and can be the same or different, such as n-Bu$_3$N or NPh$_3$, and
B) optionally a step of separating the resulting monosilanes of the general formula (I).
with the provisos
(i) at least one silane of the formula (II), (III) or (IV) has at least one chlorine substituent at the silicon atom,
and at least one of the following provisos (ii) and (iii):
(ii) at least one of the silane of the formula (II), (III) or (IV) has at least one hydrido substituent at the silicon atom,
(iii) step A) is carried out in the presence of one or more hydride donors.

2. The process according to embodiment 1, which is carried out without supply of hydrogen chloride and/or in the absence of a metal catalyst, preferably in the absence of aluminum chloride or a palladium catalyst.

3. The process according to embodiments 1 or 2, wherein step A) is carried out in an organic solvent, preferably an high-boiling ether compound, more preferably 1,4-dioxane, diglyme or tetraglyme, most preferably diglyme.

4. The process according to any of embodiments 1 to 3, wherein step A) is carried out in the presence of one or more hydride donors, preferably one or more metal hydrides, more preferably one or more metal hydrides selected from the group of alkali metal hydrides and alkaline earth metal hydrides, and most preferably lithium hydride.
5. The process according to any of the previous embodiments, wherein in general formula (I) and one or more of the general formulae (II), (III) or (IV) R is an alkyl or cycloalkyl group, preferably a methyl group.
6. The process according to any of the previous embodiments, wherein all silanes of the formulae (II), (III) or (IV) in step A) have at least one chlorine substituent at one, more or all silicon atoms.
7. The process according to any of the previous embodiments, wherein all silanes of the formulae (II), (III) or (IV) in step A) have no hydrogen substituent at one, more or all silicon atoms.
8. The process according to any of the previous embodiments, wherein the silane substrate comprises more than about 90 wt-% of one or two specific silanes of the formulae (II), (III) or (IV) having at least one chlorine substituent at the silicon atom(s), wherein the weight percentage is based on the total weight of the silane substrate.
9. The process according to any of the previous embodiments, wherein the silane substrate comprises more than about 90 wt-% of one or two specific silanes of the general formulae (II), (III) or (IV) having no hydrogen substituent at the silicon atom(s), wherein the weight percentage is based on the total weight of the silane substrate.
10. The process according to any of the previous embodiments, wherein the silane substrates of the general formulae (II), (III) or (IV) having one or more hydrogen substituents at the silicon atom in step A) are prepared by a hydrogenation reaction prior to step A).
11. The process according to any of the previous embodiments, wherein the amount of the metal hydride in step A) in relation to the silane substrate compounds is in the range of about 0.05 mol-% to about 395.95 mol-%, preferably about 20 mol-% to about 200 mol-%, more preferably about 50 mol-% to about 150 mol-%, and most preferably about 80 mol-% to about 100 mol-%.
12. The process according to any of the previous embodiments, wherein the amount of the one or more compounds (C) in step A) in relation to the silane substrate compounds is in the range of about 0.0001 mol-% to about 600 mol-%, more preferably about 0.01 mol-% to about 20 mol-%, even more preferably about 0.05 mol-% to about 2 mol-%, and most preferably about 0.05 mol-% to about 1 mol-%.
13. The process according to any of the previous embodiments 3 to 13, wherein in the step A) the weight ratio of the silane substrates to the organic solvent is in the range of about 0.01 to about 100, preferably in the range of about 0.1 to about 10, more preferably about 0.5 to about 4, most preferably about 0.5 to about 1.
14. The process according to any of the previous embodiments, wherein the step A) is conducted at a temperature of about 0° C. to about 300° C., preferably about 20° C. to about 200° C., more preferably about 80° C. to about 200° C.
15. The process according to any of the previous embodiments, wherein the step A) is conducted at a pressure of about 0.1 bar to about 30 bar, preferably about 1 bar to about 20 bar, most preferably about 1 bar to about 10 bar.
16. The process according to any of the previous embodiments, wherein the methyl monosilanes of the formula (I) are selected from the group consisting of $Me_2SiHCl$, $MeSiHCl_2$ and $MeSiH_2Cl$.
17. The process according to any of the previous embodiments, wherein the methylmonosilanes of the formula (I) are selected from the group consisting of $Me_2SiHCl$ and $MeSiHCl_2$.
18. The process according to any of the previous embodiments, wherein the silanes of the general formulae (II) or (III) are selected from the group consisting of silanes of the empirical formula: $Me_2SiCl_2$, $MeSiCl_3$, $Me_2Si_2Cl_4$ and $Me_4Si_2Cl_2$.
19. The process according to the previous embodiments, wherein the silanes of the general formula (II) are selected from the group consisting of $Me_2SiCl_2$ and $MeSiCl_3$.
20. The process according to any previous embodiments, wherein step A) is carried out in the presence of at least one compound (C) of the formula $R^1_4PCl$, wherein $R^1$ is as defined above.
21. The process according to the previous embodiment 20, wherein the one or more compounds of the formula $R^1_4PCl$ are formed in situ from compounds of the formulae $R^1_3P$ and $R^1Cl$, wherein $R^1$ is H or an organyl group.
22. The process according to any of the previous embodiments, wherein step A) is carried out in the presence of at least one metal hydride, preferably lithium hydride, preferably in a high-boiling ether compound.
23. The process according to any of the previous embodiments, wherein in step A) $Me_2SiHCl$ is produced by the reaction of $Me_2SiCl_2$ with $Me_2SiH_2$ preferably in a high-boiling ether compound.
24. The process according to any of the previous embodiments 1 to 22, wherein in step A) $MeSiHCl_2$ is produced by the reaction of $MeSiCl_3$ with $MeSiH_3$ preferably in a high-boiling ether compound.
25. The process according to the embodiments 1 to 22, wherein in step A) $Me_2SiHCl$ is produced by the reaction of $Me_2SiCl_2$ with lithium hydride in a high-boiling ether compound.
26. The process according to any of the embodiments 1 to 22 and 25, wherein in step A) $Me_2SiHCl$ is produced by the reaction of $Me_2SiCl_2$ with lithium hydride in diglyme as solvent.
27. The process according to any of the embodiments 1 to 22, wherein in step A) $MeSiHCl_2$ is produced by the reaction of $MeSiCl_3$ with lithium hydride in a high-boiling ether compound.
28. The process according to any of the embodiments 1 to 22, and 27, wherein in step A) $MeSiHCl_2$ is produced by the reaction of $MeSiCl_3$ with lithium hydride in diglyme as solvent.
29. The process according to any of the previous embodiments, wherein the step B) of separating the resulting monosilanes of the formula (I) is carried out by distillation and/or condensation.
30. The process according to any of the previous embodiments, wherein the process is performed under inert conditions.
31. Monosilanes of the general formula (I) as defined above, and mixtures thereof, as obtainable by the process according to any of the previous embodiments.
32. Compositions comprising at least one monosilane of the general formula (I) as defined above, as obtainable by the process according to any of the embodiments 1 to 30.

33. The process according to any of the previous embodiments, wherein one or more silanes of formula (II) and one or more silanes selected from the formulae (III) and (IV) are reacted.

EXAMPLES

The present invention is further illustrated by the following examples, without being limited thereto.

General

Prior to the reactions the metal salts as well as the solvents used were carefully dried according to procedures known from the literature. The reactions investigated were generally performed in sealed NMR tubes first to prevent evaporation of low boiling reaction products, such as hydrogenated organomonosilanes, and to elucidate the reaction conditions (temperature, time) for the performed reactions. Subsequently, these conditions were exemplarily transferred onto cleavage reactions in a preparative scale in a closed system, preferably a sealed glass ampoule to avoid evaporation of low boiling reaction educts and products, e.g. organochloro- and organohydridosilanes. After the reaction was completed, the ampoule was frozen, opened under vacuum and products formed were isolated by combined condensation/distillation procedures. Products were analyzed and characterized by standard procedures, especially by NMR spectroscopy and GC/MS analyses.

Identification of Products

Products were analyzed by $^1$H, $^{29}$Si and $^1$H-$^{29}$Si-HSQC NMR spectroscopy. The spectra were recorded on a Bruker AV-500 spectrometer equipped with a Prodigy BBO 500 S1 probe. $^1$H-NMR spectra were calibrated to the residual solvent proton resonance ([D$_6$]benzene $\delta_H$=7.16 ppm). Product identification was additionally supported by GC-MS analyses and verified identification of the main products. GC-MS analyses were measured with a Thermo Scientific Trace GC Ultra coupled with an ITQ 900MS mass spectrometer. The stationary phase (Macherey-Nagel PERMABOND Silane) had a length of 50 m with an inner diameter of 0.32 mm. 1 μl of analyte solution was injected, 1/25 thereof was transferred onto the column with a flow rate of 1.7 mL/min carried by Helium gas. The temperature of the column was first kept at 50° C. for 10 minutes. Temperature was then elevated at a rate of 20° C./min up to 250° C. and held at that temperature for another 40 minutes. After exiting the column, substances were ionized with 70 eV and cationic fragments were measured within a range of 34-600 m/z (mass per charge). Product mixtures were diluted with benzene prior to the measurement.

The characteristic $^{29}$Si-NMR chemical shifts and coupling constants J{$^{29}$Si-$^1$H} for compounds I to XXVIII are listed in Table 1.

TABLE 1

| compound | | $\delta^{29}$Si NMR shift (ppm) | | $^1J_{Si-H}$ (Hz) | |
|---|---|---|---|---|---|
| no. | silane | A | B | A | B |
| I | Me$_2$SiH$_2$ | −38.3 | | 187.1 | |
| II | Me$_2$SiCl$_2$ | 32.6 | | — | |
| III | Me$_2$SiHCl | 11.3 | | 222.9 | |
| IV | MeSiCl$_3$ | 12.8 | | — | |
| V | MeSiH$_2$Cl | −12.0 | | 231.6 | |
| VI | MeSiHCl$_2$ | 11.1 | | 282.7 | |
| VII | MeSiH$_3$ | −64.8 | | −193.9 | |
| VIII | PhMeSiCl$_2$ | 19.0 | | — | |
| IX | PhMeSiHCl | 2.9 | | 229.2 | |

TABLE 1-continued

| compound | | $\delta^{29}$Si NMR shift (ppm) | | $^1J_{Si-H}$ (Hz) | |
|---|---|---|---|---|---|
| no. | silane | A | B | A | B |
| X | PhMeSiH$_2$ | −36.2 | | 192.5 | |
| XI | Ph$_2$SiCl$_2$ | 5.9 | | — | |
| XII | Ph$_2$SiHCl | −5.7 | | 234.9 | |
| XIII | Ph$_2$SiH$_2$ | −33.8 | | 197.7 | |
| XIV | ViMeSiCl$_2$ | 16.8 | | — | |
| XV | ViMeSiHCl | 0.3 | | 228.4 | |
| XVI | ViMeSiH$_2$ | −40.6 | | 192.7 | |
| XVII | (Me$_2$ClSi)$_2$ | 17.4 | | — | |
| XVIII | (Me$_2$HSi)$_2$ | −39.6 | | 177.8 | |
| XIX | Me$_2$ClSi$^A$—Si$^B$HMe$_2$ | 23.0 | −39.1 | — | 181.1 |
| XX | (Cl$_2$MeSi)$_2$—CH$_2$ | 26.2 | | — | |
| XXI | ClMe$_2$Si$^A$—CH$_2$—Si$^B$MeCl$_2$ | 28.1 | 25.7 | — | |
| XXII | (Me$_2$ClSi)$_2$—CH$_2$ | 28.3 | | — | |
| XXIII | Me$_3$Si$^A$—CH$_2$—Si$^B$Me$_2$Cl | −0.4 | 30.0 | — | |
| XXIV | (H$_2$MeSi)$_2$—CH$_2$ | −36.5 | | 189.8 | |
| XXV | HMe$_2$Si$^A$—CH$_2$—Si$^B$MeH$_2$ | −15.1 | −38.0 | 184.2 | 188.6 |
| XXVI | (Me$_2$HSi)$_2$—CH$_2$ | −16.2 | | 183.9 | |
| XXVII | Me$_3$Si$^A$—CH$_2$—Si$^B$Me$_2$H | 0.2 | −16.7 | — | 182.3 |
| XXVIII | MeCl$_2$Si—SiCl$_2$Me | 17.5 | | — | |

Wherein Vi = vinyl, Ph = Phenyl

Example 1

Dimethyldihydridomonosilane (1.0 mmol) and dimethyldichloromonosilane (1.5 mmol) were mixed in a molar ratio of 41 to 59 (given in mol-% as educt mixture in Table 2) with a catalytic amount of the redistribution catalyst PPh$_3$ (0.02 mmol) in diglyme (0.35 ml) as solvent in an NMR tube, solidified at −196° C. (liquid nitrogen) and sealed in vacuo. After warming the samples to r.t., $^{29}$Si- and $^1$H-NMR spectra were measured to prove the degree of SiH/SiCl redistributions after different reaction times and temperatures to control and quantify product formation by integration of the intensity of relevant NMR signals within the mixture. The product yields are given in mol-% in Table 2.

TABLE 2

| no. | silane | educt (%) | 80° C. 2 h | 120° C. + 21 h | 140° C. + 48 h | 160° C. + 160 h |
|---|---|---|---|---|---|---|
| I | Me$_2$SiH$_2$ | 41 | 41 | 36 | 13 | 13 |
| II | Me$_2$SiCl$_2$ | 59 | 59 | 59 | 33 | 29 |
| III | Me$_2$SiHCl | — | — | 5 | 54 | 58 |

Silanes I and II started to react at 120° C. (21 h) to give the targeted product III in an amount of 5%. With prolonged reactions times (48 h) at 140° C., the molar amount of III increased to 54%. The maximum amount of chlorosilane III formed by redistribution was 58% after 160 h at 160° C.

Example 2

Dimethyldihydridomonosilane (1.0 mmol) and dimethyldichloromonosilane (1.3 mmol) were mixed in a molar ratio of 44 to 56 (given in mol-% as educt mixture in Table 3) with a catalytic amount of the redistribution catalyst n-Bu$_3$P (0.2 mmol) in diglyme (0.35 ml) as solvent in an NMR tube, solidified at −196° C. (liquid nitrogen) and sealed in vacuo. After warming the samples to r.t., $^{29}$Si- and $^1$H-NMR spectra were measured to prove the degree of SiH/SiCl redistributions after different reaction times and temperatures to control and quantify product formation by integration of the intensity of relevant NMR signals within the mixture. The product yields are given in mol-% in Table 3.

TABLE 3

| no. | silane | educt (%) | 80° C. 2 h | 120° C. + 21 h | 140° C. + 48 h | 160° C. + 160 h |
|---|---|---|---|---|---|---|
| I | $Me_2SiH_2$ | 44 | 44 | 45 | 18 | 15 |
| II | $Me_2SiCl_2$ | 56 | 56 | 51 | 33 | 26 |
| III | $Me_2SiHCl$ | — | — | 4 | 49 | 59 |

Similar to Example 1, redistribution reactions started to occur at 120° C. (21 h) to give III in an amount of 4%. The maximum amount of chlorosilane III formed by redistribution was 59% after 160 h at 160° C.

Example 3

LiH (1.5 mmol), $Me_2SiCl_2$ (1.6 mmol), diglyme (0.4 ml) and a catalytic amount of $PPh_3$ (0.02 mmol) were placed in an NMR tube that was cooled to −196° C. (liquid nitrogen). After evacuation in vacuo the NMR tube was sealed and warmed to r.t. The starting materials reacted upon heating the sample, and the reaction course of the chlorosilane reduction/redistribution reaction was monitored by NMR spectroscopy.

TABLE 4

| no. | silane | 120° C., 13 h | 160° C., +22 h | 160° C., +40 h |
|---|---|---|---|---|
| I | $Me_2SiH_2$ | 32 | 14 | 11 |
| II | $Me_2SiCl_2$ | 66 | 47 | 33 |
| III | $Me_2SiHCl$ | 2 | 39 | 56 |

As can be seen from Table 4, the formation of $Me_2SiHCl$ III was steadily increasing with increasing reaction temperature and time. The maximum amount of chlorosilane III formed by redistribution of hydridosilane I with dichlorosilane II was 56% after 62 h at 160° C.

Example 4

The reaction was performed in analogy to the reaction of Example 3 using $n-Bu_3P$ (0.02 mmol) as redistribution catalyst.

TABLE 5

| no. | silane | 120° C., 13 h | 160° C., +22 h | 160° C., +40 h |
|---|---|---|---|---|
| I | $Me_2SiH_2$ | 34 | 25 | 16 |
| II | $Me_2SiCl_2$ | 64 | 48 | 30 |
| III | $Me_2SiHCl$ | 2 | 27 | 54 |

Similar to Example 3, the maximum amount of chlorosilane III formed by redistribution was 54% after 62 h at 160° C. (Table 5).

Example 5

In analogy to Example 3, $MeSiCl_3$ (1.7 mmol) was reacted with LiH (1.5 mmol) in diglyme (0.4 ml) as solvent and in the presence of a catalytic amount of $PPh_3$ (0.02 mmol) as redistribution catalyst.

TABLE 6

| no. | silane | 120° C., 13 h | 160° C., +22 h | 160° C., +40 h |
|---|---|---|---|---|
| IV | $MeSiCl_3$ | 60 | 22 | 12 |
| V | $MeSiH_2Cl$ | 5 | 15 | 23 |
| VI | $MeSiHCl_2$ | 3 | 62 | 62 |
| VII | $MeSiH_3$ | 32 | 1 | 3 |

After 13 h at 120° C. $MeSiCl_3$ IV was reduced to give silane VII in 32% as well as V and VI in amounts of 5% and 3% by redistribution reactions. Increasing the reaction temperature to 160° C. (22 h) gave $MeSiHCl_2$ VI in 62% and $MeSiH_2Cl$ V in 15%, while silane VII remained in an amount of only 1%. With prolonged reaction times the amount of chlorosilane IV was further reduced to give $MeSiH_2Cl$ (V) in 23%. The targeted product VI remained in an amount of 62% (Table 6).

Example 6

The reaction was performed in analogy to the reaction of Example 5 using $n-Bu_3P$ (0.02 mmol) as redistribution catalyst.

TABLE 7

| no. | silane | 120° C., 13 h | 160° C., +22 h | 160° C., +40 h |
|---|---|---|---|---|
| IV | $MeSiCl_3$ | 49 | 27 | 19 |
| V | $MeSiH_2Cl$ | 13 | 10 | 15 |
| VI | $MeSiHCl_2$ | 34 | 63 | 66 |
| VII | $MeSiH_3$ | 4 | traces | traces |

As listed in Table 7, the targeted products VI and V were formed in amounts of 34% and 13%, respectively at 120° C./13 h. The maximum amount of chlorosilanes VI and V formed by redistribution of hydridosilane VII with methyltrichlorosilane IV was 66% and 15% after 62 h at 160° C.

Example 7

$MeSiH_3$ (1.1 mmol), $MeSiCl_3$ (2.1 mmol), diglyme (0.35 ml) and a catalytic amount of $PPh_3$ (0.05 mmol) were placed in an NMR tube that was cooled to −196° C. (liquid nitrogen). After evacuation in vacuo the NMR tube was sealed and warmed to r.t. The starting materials reacted upon heating the sample, and the reaction course of the chlorosilane reduction/redistribution reaction was monitored by NMR spectroscopy.

TABLE 8

| no. | silane | 80° C., 6 h | 160° C., +22 h | 160° C., +40 h |
|---|---|---|---|---|
| IV | $MeSiCl_3$ | 50 | 20 | 19 |
| V | $MeSiH_2Cl$ | 11 | 16 | 16 |
| VI | $MeSiHCl_2$ | 4 | 62 | 64 |
| VII | $MeSiH_3$ | 35 | 2 | 1 |

At 80° C./6 h targeted products VI and V were formed in amounts of 4% and 11%, respectively. With prolonged reaction times (62 h/160° C.), the molar amounts of VI and V increased to 64% and 16%, while $MeSiH_3$ VII was consumed almost quantitatively (Table 8).

Example 8

The reaction was performed in an analogous manner to the reaction of Example 7 using $MeSiH_3$ (1.1 mmol), MeSiCl$_3$ (2.1 mmol), diglyme (0.35 ml) and a catalytic amount of n-Bu3P (0.05 mmol).

TABLE 9

| no. | silane | 80° C., 6 h | 160° C., +22 h | 160° C., +40 h |
|---|---|---|---|---|
| IV | MeSiCl$_3$ | 55 | 30 | 29 |
| V | MeSiH$_2$Cl | 15 | 9 | 6 |
| VI | MeSiHCl$_2$ | 10 | 61 | 65 |
| VII | MeSiH$_3$ | 20 | — | — |

Similar to Example 7, targeted products VI and V were formed in amounts of 10% and 15% at 80° C./6 h, while prolonged reaction times (62 h) at 160° C. increased the molar amounts of VI and V to 65% and 6%, respectively. Related to the starting hydridosilane VII, the redistribution reaction was quantitative (Table 9).

Example 9

The reaction was performed in an analogous manner to the reaction of Example 7 using Me$_2$SiH$_2$ (1.1 mmol), MeSiCl$_3$ (1.1 mmol), diglyme (0.35 ml) and a catalytic amount of n-Bu$_3$P (0.05 mmol).

TABLE 10

| no. | silane | 80° C., 7 h | 100° C., +22 h | 160° C., +40 h |
|---|---|---|---|---|
| I | Me$_2$SiH$_2$ | 36 | traces | — |
| II | Me$_2$SiCl$_2$ | 2 | 15 | 28 |
| III | Me$_2$SiHCl | 16 | 29 | 11 |
| IV | MeSiCl$_3$ | 33 | 7 | 2 |
| V | MeSiH$_2$Cl | 3 | 11 | 22 |
| VI | MeSiHCl$_2$ | 9 | 36 | 32 |
| VII | MeSiH$_3$ | 1 | 2 | 5 |

As listed in Table 10, at 80° C. for 7 h the targeted products Me$_2$SiHCl III, MeSiHCl$_2$ VI and MeSiH$_2$Cl VI were formed in an amount of 16%, 9% and 3%, respectively. Prolonged reaction times (22 h) at 100° C. gave III, VI and V in amounts of 29%, 36% and 11%, respectively while starting silane I was fully chlorinated to give II and III. After 40 h at 160° C. the amount of III (32%) decreased due to chlorination (to form II), while the amount of VI (32%) decreased due to hydrogenation. MeSiH$_2$Cl V and MeSiH$_3$ VII were formed in amounts of 22% and 5%, respectively.

Example 10

The reaction was performed in analogy to the reaction of Example 3 using MeSiH$_3$ (1.1 mmol), Me$_2$SiCl$_2$ (1.7 mmol), diglyme (0.35 ml) and a catalytic amount of n-Bu$_3$P (0.05 mmol).

TABLE 11

| no. | silane | 80° C., 6 h | 160° C., +22 h | 160° C., +40 h |
|---|---|---|---|---|
| I | Me$_2$SiH$_2$ | — | 2 | traces |
| II | Me$_2$SiCl$_2$ | 55 | 33 | 33 |
| III | Me$_2$SiHCl | 1 | 28 | 30 |
| V | MeSiH$_2$Cl | 2 | 16 | 16 |
| VI | MeSiHCl$_2$ | — | 9 | 10 |
| VII | MeSiH$_3$ | 42 | 12 | 11 |

As listed in Table 11, only small amounts of redistribution products (III in an amount of 1%, V in an amount of 2%) were detected after 6 h at 80° C. After 22 h at 160° C. targeted products III, VI and V were formed in amounts of 28%, 9% and 16%, respectively, while the starting molar amount of silane VII decreased to 12%. The maximum amount of III (30%) was formed after 40 h at 160° C., while that of VI, V and VII did not change significantly.

Example 11

The reaction was performed analogously to the reaction of Example 7 using Me$_2$SiH$_2$ (1.1 mmol), PhMeSiCl$_2$ (1.1 mmol), diglyme (0.35 ml) and a catalytic amount of n-Bu$_3$P (0.05 mmol).

TABLE 12

| no. | silane | 160° C., 22 h | 160° C., +40 h |
|---|---|---|---|
| I | Me$_2$SiH$_2$ | 13 | 5 |
| II | Me$_2$SiCl$_2$ | 7 | 14 |
| III | Me$_2$SiHCl | 34 | 29 |
| VIII | PhMeSiCl$_2$ | 13 | 7 |
| IX | PhMeSiHCl | 24 | 32 |
| X | PhMeSiH$_2$ | 9 | 13 |

After 22 h at 160° C., starting silane I was chlorinated to give III in an amount of 34% and II in an amount of 7%, while PhMeSiCl$_2$ VIII was hydrogenated to give IX and X in an amount of 24% and an amount of 9%, respectively. With prolonged reaction times at 160° C. the amount of III (29%) decreased due to chlorination, while that of IX (32%) and X (13%) increased due to hydrogenation (Table 12).

Example 12

The reaction was performed in analogy to the reaction of Example 7 using Me$_2$SiH$_2$ (1.1 mmol), Ph$_2$SiCl$_2$ (1.1 mmol), diglyme (0.35 ml) and a catalytic amount of n-Bu$_3$P (0.05 mmol).

TABLE 13

| no. | silane | 160° C., 22 h | 160° C., +40 h |
|---|---|---|---|
| I | Me$_2$SiH$_2$ | 14 | 3 |
| II | Me$_2$SiCl$_2$ | 5 | 15 |
| III | Me$_2$SiHCl | 35 | 25 |
| XI | Ph$_2$SiCl$_2$ | 10 | 3 |
| XII | Ph$_2$SiHCl | 22 | 36 |
| XIII | Ph$_2$SiH$_2$ | 14 | 18 |

Similar to Example 11, the maximum amount of III (35%) was formed at 160° C./22 h; XI was hydrogenated through redistribution to give XII and XIII in amounts of 22% and 14%, respectively. With prolonged reaction times at 160° C., the amount of III decreased to 25%, while that of XII (36%) and XIII (18%) increased (Table 13).

Example 13

The reaction was performed in an analogous manner to the reaction of Example 7 using Me$_2$SiH$_2$ (1.1 mmol), ViMeSiCl$_2$ (1.1 mmol), diglyme (0.35 ml) and a catalytic amount of n-Bu$_3$P (0.05 mmol).

TABLE 14

| no. | silane | 80° C., 7 h | 100° C., +22 h | 160° C., +40 h |
|---|---|---|---|---|
| I | Me$_2$SiH$_2$ | 11 | 3 | 2 |
| II | Me$_2$SiCl$_2$ | 3 | 15 | 19 |
| III | Me$_2$SiHCl | 40 | 31 | 27 |

TABLE 14-continued

| no. | silane | 80° C., 7 h | 100° C., +22 h | 160° C., +40 h |
|---|---|---|---|---|
| V | MeSiH$_2$Cl | — | — | 5 |
| VI | MeSiHCl$_2$ | — | — | 1 |
| VII | MeSiH$_3$ | traces | 4 | 10 |
| XIV | ViMeSiCl$_2$ | 19 | 9 | 4 |
| XV | ViMeSiHCl | 20 | 30 | 17 |
| XVI | ViMeSiH$_2$ | 7 | 8 | 4 |
|  | not ident. | — | — | 11 |

As listed in Table 14, the maximum amount of III (40%) was formed at 80° C./7 h; hydrogenation of ViMeSiCl$_2$ XIV gave XV and XVI in molar amounts of 20% and 7%, respectively. At 100° C./22 h XIV was further reduced to give XV and XVI in 30% and 8%, while the amount of III (31%) decreased due to chlorination; MeSiH$_3$ (VII, 4%) was formed by cleavage of the vinyl group. Prolonged reaction times at 160° C. increased the formation of VII (10%) as well as of V (5%) and VI (1%), while the amounts of III (27%), XV (17%) and XVI (4%) decreased. Furthermore, non-identified products were formed in 11%.

Example 14

11.13 g (86.2 mmol) Me$_2$SiCl$_2$, 3.30 g (54.9 mmol) Me$_2$SiH$_2$, 0.73 g (2.8 mmol) PPh$_3$, 1.5 ml C$_6$D$_6$ and 8 ml diglyme were placed in a cooled ampoule (−196° C.) with an attached NMR tube; the ampoule was evacuated and sealed. After 160 h at 160° C., 0.6 ml of the product mixture was poured from the ampoule into the NMR tube, which was then sealed and disconnected from the ampoule. NMR spectroscopic measurements revealed a product distribution listed in Table 15.

TABLE 15

| no. | silane | mol-% | mmol | g |
|---|---|---|---|---|
| I | Me$_2$SiH$_2$ | 11 | 15.2 | 0.9 |
| II | Me$_2$SiCl$_2$ | 30 | 42.6 | 5.5 |
| III | Me$_2$SiHCl | 59 | 82.8 | 7.8 |

As listed in Table 15, Me$_2$SiHCl (III) was formed in an amount of 59 mol-%. Related to the starting amount of dimethylsilane, 72% have been converted into the target product.

Example 15

12.2 g (81.7 mmol) MeSiCl$_3$, 1.26 g (27.2 mmol) MeSiH$_3$, 0.35 g (1.3 mmol) PPh$_3$, 1.5 ml C$_6$D$_6$ and 8 ml diglyme were placed in a cooled ampoule (−196° C.) with an attached NMR tube; the ampoule was evacuated and sealed. After 72 h at 160° C., 0.6 ml of the product mixture was poured from the ampoule into the NMR tube, which was then sealed and disconnected from the ampoule. NMR spectroscopic measurements revealed a product distribution listed in Table 16.

TABLE 16

| no. | silane | mol-% | mmol | g |
|---|---|---|---|---|
| IV | MeSiCl$_3$ | 30 | 38.3 | 5.7 |
| V | MeSiH$_2$Cl | 9 | 10.1 | 0.81 |
| VI | MeSiHCl$_2$ | 61 | 66.7 | 7.7 |
| VII | MeSiH$_3$ | traces | — | — |

As listed in Table 16, MeSiHCl$_2$ VI and MeSiH$_2$Cl V were formed in amounts of 61% and 9%, respectively. Related to the starting amount of methylsilane, the redistribution reaction was quantitative.

Example 16

The reaction was performed analogously to the reaction of Example 5 using n-Bu$_3$N (0.02 mmol) as redistribution catalyst.

TABLE 17

| no. | silane | 120° C., 13 h | 160° C., +22 h | 160° C., +40 h |
|---|---|---|---|---|
| IV | MeSiCl$_3$ | 70 | 53 | 41 |
| V | MeSiH$_2$Cl | 3 | 14 | 22 |
| VI | MeSiHCl$_2$ | 2 | 10 | 28 |
| VII | MeSiH$_3$ | 25 | 23 | 9 |

After 13 h at 120° C. MeSiCl$_3$ IV was reduced to give silane VII in 25% as well as V and VI in amounts of 2% and 3%, respectively though redistribution reactions. Increasing the reaction temperature to 160° C. (22 h) gave MeSiHCl$_2$ VI in an amount of 10% and MeSiH$_2$Cl V in an amount of 14%, while silane VII remained at a level of 23%. With prolonged reaction times the amount of chlorosilane IV was further reduced to give the targeted products VI and V in amounts of 28% and 22%, respectively. MeSiH$_3$ VII remained at a level of 9% (Table 17).

Example 17

The reaction was performed analogously to the reaction of Example 5 using NPh$_3$ (0.02 mmol) as redistribution catalyst.

TABLE 18

| no. | silane | 120° C., 13 h | 160° C., +22 h | 160° C., +40 h |
|---|---|---|---|---|
| IV | MeSiCl$_3$ | 74 | 55 | 37 |
| V | MeSiH$_2$Cl | 5 | 16 | 8 |
| VI | MeSiHCl$_2$ | 2 | 18 | 55 |
| VII | MeSiH$_3$ | 19 | 11 | — |

As listed in Table 18, methylsilane VII was formed in an amount of 19% as well as V and VI in amounts of 2% and 5%, respectively via redistribution of VII with IV. The maximum amount of MeSiHCl$_2$ VI was 55% at 160° C./62 h, while MeSiH$_3$ VII was completely consumed; methylchlorosilane V reached a level of 8%.

Example 18

The reaction was performed in analogy to the reaction of Example 7 using Me$_2$SiH$_2$ (1.6 mmol), Me$_2$SiCl$_2$ (1.6 mmol), diglyme (0.35 ml) and a catalytic amount of NPh$_3$ (0.04 mmol).

TABLE 19

| no. | silane | 80° C., 7 h | 160° C., +22 h | 200° C., +40 h |
|---|---|---|---|---|
| I | Me$_2$SiH$_2$ | 49 | 44 | 36 |
| II | Me$_2$SiCl$_2$ | 51 | 54 | 45 |
| III | Me$_2$SiHCl | — | 2 | 19 |

At 80° C./7 h no product formation was detected. Increasing the reaction temperature to 200° C. (40 h) gave Me$_2$SiHCl III in an amount of 19% (Table 19).

Example 19

Me$_2$HSi—SiHMe$_2$ (0.3 mmol), Me$_2$SiCl$_2$ (0.8 mmol), diglyme (0.4 ml) and a catalytic amount of PPh$_3$ (0.05 mmol) were placed in an NMR tube that was cooled to −196° C. (liquid nitrogen).

After evacuation in vacuo the NMR tube was sealed and warmed to r.t. The starting materials reacted upon heating the sample, and the reaction course of the chlorosilane reduction/redistribution reaction was monitored by NMR spectroscopy.

TABLE 20

| no. | silane | 160° C., 16 h | 220° C., +15 h |
|---|---|---|---|
| I | Me$_2$SiH$_2$ | — | 2 |
| II | Me$_2$SiCl$_2$ | 70 | 64 |
| III | Me$_2$SiHCl | 3 | 7 |
| XVII | (Me$_2$ClSi)$_2$ | — | 1 |
| XVIII | (Me$_2$HSi)$_2$ | 25 | 21 |
| XIX | Me$_2$ClSi—SiHMe$_2$ | 2 | 5 |

At 220° C./15 h dimethyldichlorosilane was hydrogenated to give Me$_2$SiHCl III in an amount of 7% and Me$_2$SiH$_2$ I in an amount of 2%, while the starting material hydridodisilane XVIII was chlorinated to give the partially chlorinated disilane XIX in an amount of 5% as well as the fully chlorinated disilane XVII in an amount of 1% (Table 20).

Example 20

The reaction was performed in an analogous manner to the reaction of Example 19 using MeCl$_2$Si—SiCl$_2$Me (0.6 mmol), MeSiCl$_3$ (0.6 mmol), LiH (1.5 mmol), diglyme (0.4 ml) and PPh$_3$ (0.05 mmol) as redistribution catalyst.

TABLE 21

| no. | silane | 160° C., 16 h | 220° C., +15 h |
|---|---|---|---|
| IV | MeSiCl$_3$ | 42 | 29 |
| V | MeSiH$_2$Cl | 8 | 11 |
| VI | MeSiHCl$_2$ | 50 | 56 |
| | not ident. | — | 4 |

After 16 h at 160° C. the starting disilane MeCl$_2$Si—SiCl$_2$Me XXVIII was quantitatively cleaved and via redistribution reactions the targeted products MeSiHCl$_2$ VI and MeSiH$_2$Cl V were formed in amounts of 50% and 8%, respectively. With prolonged reaction times (15 h) at 220° C. the molar amounts of VI and V were further increased to 56% and 11%, while not identified products were formed in an amount of 4% (Table 21).

Example 21

0.6 mmol of a complex mixture of chlorocarbodisilanes (carbodisilane distribution is listed in Table 22), Me$_2$SiCl$_2$ (0.8 mmol), LiH (1.6 mmol), n-Bu$_3$P (0.05 mmol) and diglyme (0.3 ml) were placed in a cooled NMR tube (−196° C.). After evacuation in vacuo the NMR tube was sealed and warmed to r.t. The starting materials reacted upon heating the sample, and the reaction course of the chlorosilane reduction/redistribution reaction was monitored by NMR spectroscopy.

TABLE 22

| no. | silane | educt (%) |
|---|---|---|
| XX | (Cl$_2$MeSi)$_2$—CH$_2$ | 45 |
| XXI | ClMe$_2$Si—CH$_2$—SiMeCl$_2$ | 31 |
| XXII | (Me$_2$ClSi)$_2$—CH$_2$ | 14 |
| XXIII | Me$_3$Si—CH$_2$—SiMe$_2$Cl | 10 |

TABLE 23

| no. | silane | 160° C., 16 h | 220° C., +15 h |
|---|---|---|---|
| I | Me$_2$SiH$_2$ | 34 | 5 |
| II | Me$_2$SiCl$_2$ | 36 | 25 |
| III | Me$_2$SiHCl | 8 | 34 |
| V | MeSiH$_2$Cl | — | 7 |
| VI | MeSiHCl$_2$ | — | 7 |
| VII | MeSiH$_3$ | 2 | 9 |
| | carbodisilanes | 20 | 13 |

After 16 h at 160° C. the targeted product Me$_2$SiHCl III as well as dimethylsilane were formed in amounts of 8% and 34%, respectively. Hydrogenation and cleavage of chlorocarbodisilanes gave methylsilane VII in an amount of 2%. With prolonged reaction times (15 h) at 220° C. the molar amount of III increased to 34%, while that of Me$_2$SiH$_2$ Idecreased (5%) due to redistribution reactions with chlorosilanes. Carbodisilanes were further cleaved (13% remained) to give silanes VI, V and VII in amounts of 7%, 7% and 9%, respectively (Table 23).

Example 22

0.8 mmol of a complex mixture of hydridocarbodisilanes (carbodisilane distribution is listed in Table 24), Me$_2$SiCl$_2$ (0.8 mmol), n-Bu$_3$P (0.05 mmol) and diglyme (0.35 ml) were placed in a cooled NMR tube (−196° C.). After evacuation in vacuo the NMR tube was sealed and warmed to r.t. The starting materials reacted upon heating the sample, and the reaction course of the chlorosilane reduction/redistribution reaction was monitored by NMR spectroscopy.

TABLE 24

| no. | silane | educt (%) |
|---|---|---|
| XXIV | (H$_2$MeSi)$_2$—CH$_2$ | 70 |
| XXV | HMe$_2$Si—CH$_2$—SiMeH$_2$ | 23 |
| XXVI | (Me$_2$HSi)$_2$—CH$_2$ | 6 |
| XXVII | Me$_3$Si—CH$_2$—SiMe$_2$H | 1 |

TABLE 25

| no. | silane | 160° C., 16 h | 220° C., +15 h |
|---|---|---|---|
| I | Me$_2$SiH$_2$ | — | 20 |
| II | Me$_2$SiCl$_2$ | 45 | 3 |
| III | Me$_2$SiHCl | 2 | 29 |
| V | MeSiH$_2$Cl | — | 3 |
| VI | MeSiHCl$_2$ | — | 10 |
| VII | MeSiH$_3$ | 2 | 24 |
| | carbodisilanes | 51 | 11 |

After 16 h at 160° C. the targeted product Me$_2$SiHCl III was formed only in an amount of 2%. Increasing the reaction temperature to 220° C. for 15 h gave III in an amount of 29% as well as dimethylsilane in an amount of 20%. The molar amount of carbodisilanes decreased from 51% to 11%, leading to MeSiHCl$_2$ VI, MeSiH$_2$Cl V and MeSiH$_3$ VII in amounts of 10%, 3% and 24%, respectively (Table 25).

Comparative Example 1

Dimethyldihydridomonosilane (0.318 mmol) and dimethyldichloromonosilane (0.281 mmol) were mixed in a molar ratio of 53 to 47 (given in mol-% as educt mixture in Table 26) with a catalytic amount of the redistribution catalyst lithium chloride (0.08 mmol) in diglyme (0.4 ml) as solvent in an NMR tube, solidified at −196° C. (liquid nitrogen) and sealed in vacuo. After warming the samples to r.t., $^{29}$Si- and $^1$H-NMR spectra were measured to prove the degree of SiH/SiCl redistributions after different reaction times and temperatures to control and quantify product formation by integration of the intensity of relevant NMR signals within the mixture. The product yields are given in mol-% in Table 26.

Me$_2$SiHCl III was formed from a nearly equimolar mixture of monosilanes I and II in an amount of 9% yield, but only at high temperatures (160° C.) and with long reaction times (320 h).

TABLE 26

| no. | silane | educt (%) | 2.5 h | 16 h | 64 h | 127 h | 320 h |
|---|---|---|---|---|---|---|---|
| I | Me$_2$SiH$_2$ | 53 | 52 | 52 | 51 | 50 | 49 |
| II | Me$_2$SiCl$_2$ | 47 | 46 | 46 | 45 | 45 | 42 |
| III | Me$_2$SiHCl | — | 2 | 2 | 4 | 5 | 9 |

Comparative Example 2

Methylsilane VII (1.2 mmol) and methyltrichlorosilane IV (0.9 mmol) were mixed in a molar ratio of 58 to 42 (given in mol-% as educt mixture in Table 27) with a catalytic amount of the redistribution catalyst lithium chloride (0.08 mmol) in diglyme (0.4 ml) as solvent in an NMR tube, solidified at −196° C. (liquid nitrogen) and sealed in vacuo. After warming the samples to r.t., $^{29}$Si- and $^1$H-NMR spectra were measured to prove the degree of SiH/SiCl redistributions after different reaction times and temperatures to control and quantify product formation by integration of the intensity of relevant NMR signals within the mixture. The product yields are given in mol-% in Table 27.

The targeted compounds V and VI were obtained in amounts of 42% and 35%, respectively, at a reaction temperature of 160° C. and with a long reaction time (320 h).

TABLE 27

| no. | silane | educt (%) | 2.5 h | 16 h | 64 h | 127 h | 320 h |
|---|---|---|---|---|---|---|---|
| IV | MeSiCl$_3$ | 42 | 40 | 34 | 23 | 15 | 5 |
| V | MeSiH$_2$Cl | — | 4 | 13 | 30 | 38 | 42 |
| VI | MeSiHCl$_2$ | — | — | 4 | 14 | 25 | 35 |
| VII | MeSiH$_3$ | 58 | 56 | 49 | 33 | 22 | 14 |

Comparative Example 3

The reaction was performed in an analogous manner to the reaction of Example 19 using Me$_2$HSi—SiHMe$_2$ (0.3 mmol), Me$_2$SiCl$_2$ (0.8 mmol), diglyme (0.4 ml) and AlCl$_3$ (0.05 mmol) as redistribution catalyst.

TABLE 28

| no. | silane | 160° C., 16 h | 220° C., +15 h |
|---|---|---|---|
| I | Me$_2$SiH$_2$ | 7 | 6 |
| II | Me$_2$SiCl$_2$ | 12 | — |
| III | Me$_2$SiHCl | 9 | — |
| XVII | (Me$_2$ClSi)$_2$ | 1 | 3 |
| XVIII | (Me$_2$HSi)$_2$ | 10 | 7 |
| XIX | Me$_2$ClSi—SiHMe$_2$ | 15 | 16 |
|  | not ident. | 46 | 68 |

After 16 h at 160° C. Me$_2$SiHCl III and Me$_2$SiH$_2$ I were formed in 9% and 7%, respectively, besides 15% of the partially chlorinated disilane XIX and 46% of not identified byproducts. With prolonged reaction times (15 h) at 220° C. byproducts were formed in 68%, while the targeted product III was completely decomposed. The results are displayed in Table 28.

The invention claimed is:
1. A process for the manufacture of monosilanes of the general formula (I):

$$R_xSiH_yCl_z \qquad (I),$$

wherein R is an organyl group which is selected from the groups consisting of: alkyl, aryl, alkenyl, alkynyl, alkaryl, aralkyl, aralkenyl, aralkynyl, cycloalkyl, cycloalkenyl, cycloalkynyl, cycloaralkyl, cycloaralkenyl, and cycloaralkynyl,
x=1 to 3,
y=1 to 3,
z=0 to 3, and
x+y+z=4,
comprising:
A) the step of subjecting a silane substrate comprising one or more silanes, selected from the group consisting of:
a) monosilanes of the general formula (II)

$$R_aSiH_bCl_c \qquad (II)$$

wherein R is as defined above,
a=1 to 3,
b=0 to 3,
c=0 to 3 and
a+b+c=4, and
b) disilanes of the general formula (III)

$$R_eSi_2H_fCl_g \qquad (III)$$

wherein R is as defined above,
e=1 to 5,
f=0 to 5,
g=0 to 5 and
e+f+g=6,
c) carbodisilanes of the general formula (IV)

$$R_m(SiCH_2Si)H_nCl_o \qquad (IV)$$

wherein R is as defined above,
m=1 to 5,
n=0 to 5,
o=0 to 5 and
m+n+o=6
to a reaction
in the presence of one or more compounds (C) selected from the group consisting of:
phosphanes R$^1$$_3$P, wherein R$^1$ is hydrogen or an organyl group as defined and can be the same or different, and
amines R$^1$$_3$N, wherein R$^1$ is hydrogen or an organyl group as defined and can be the same or different, wherein the process for the manufacture of monosilanes is carried out without supply of hydrogen chloride and in the absence of $AlCl_3$ and B) optionally a step of separating the resulting monosilanes of the general formula (I), with the provisos (i) at least one silane of the formula (II), (III) or (IV) has at least one chlorine substituent at the silicon atom, and at least one of the following provisos (ii) and (iii):

(ii) at least one of the silane of the formula (II), (III) or (IV) has at least one hydrido substituent at the silicon atom, and (iii) step A) is carried out in the presence of one or more hydride donors.

2. The process according to claim 1, which is carried out in the absence of a metal catalyst.

3. The process of claim 1, wherein step A) is carried out in an organic solvent.

4. The process of claim 1, wherein step A) is carried out in the presence of one or more hydride donors.

5. The process of claim 4, wherein the one or more hydride donors are one or more metal hydride donors selected from the group consisting of alkali metal hydrides and alkaline earth metal hydrides.

6. The process of claim 1, wherein in general formula (I) and one or more of the general formulae (II), (III) or (IV) R is an alkyl or cycloalkyl group.

7. The process of claim 1, wherein all silanes of the formulae (II), (III) or (IV) in step A) have at least one chlorine substituent at one, more or all silicon atoms.

8. The process of claim 1, wherein all silanes of the formulae (II), (III) or (IV) in step A) have no hydrogen substituent at one, more or all silicon atoms.

9. The process of claim 1, wherein the silane substrate comprises more than 90 wt-% of one or two, specific silanes of the formulae (II), (III) or (IV) having at least one chlorine substituent at the silicon atom(s), wherein the weight percentage is based on the total weight of the silane substrate, or wherein the silane substrate comprises more than 90 wt-% of one or two, specific silanes of the general formulae (II), (III) or (IV) having no hydrogen substituent at the silicon atom(s), wherein the weight percentage is based on the total weight of the silane substrate.

10. The process of claim 1, wherein the step A) is conducted at a temperature of 0° C. to 300° C.

11. The process of claim 1, wherein the methyl monosilanes of the formula (I) are selected from the group consisting of $Me_2SiHCl$, $MeSiHCl_2$ and $MeSiH_2Cl$.

12. The process of claim 1, wherein the silanes of the general formulae (II) or (III) are selected from the group consisting of silanes of the empirical formulae: $Me_2SiCl_2$, $MeSiCl_3$, $Me_2Si_2Cl_4$ and $Me_4Si_2Cl_2$.

13. The process of claim 1, wherein in step A) $Me_2SiHCl$ is produced by the reaction of $Me_2SiCl_2$ with $Me_2SiH_2$ or wherein in step A) $MeSiHCl_2$ is produced by the reaction of $MeSiCl_3$ with $MeSiH_3$, or wherein in step A) $Me_2SiHCl$ is produced by the reaction of $Me_2SiCl_2$ with lithium hydride in a high-boiling ether compound, or wherein in step A) $Me_2SiHCl$ is produced by the reaction of $Me_2SiCl_2$ with lithium hydride in diglyme as solvent, or wherein in step A) $MeSiHCl_2$ is produced by the reaction of $MeSiCl_3$ with lithium hydride in a high-boiling ether compound, or wherein in step A) $MeSiHCl_2$ is produced by the reaction of $MeSiCl_3$ with lithium hydride in diglyme as solvent.

14. The process of claim 1, wherein the step B) of separating the resulting monosilanes of the formula (I) is carried out by distillation and/or condensation.

15. The process of claim 1, wherein one or more silanes of formula (II) and one or more silanes selected from the formulae (III) and (IV) are reacted.

* * * * *